US007681346B2

(12) United States Patent
Bruce

(10) Patent No.: US 7,681,346 B2
(45) Date of Patent: Mar. 23, 2010

(54) ADVERTISING APPARATUS AND METHOD

(76) Inventor: Shad E. Bruce, 1515 W. University Dr., Suite 104, Tempe, AZ (US) 85281

( * ) Notice: Subject to any disclaimer, the term of this patent is extended or adjusted under 35 U.S.C. 154(b) by 1 day.

(21) Appl. No.: 11/854,328

(22) Filed: Sep. 12, 2007

(65) Prior Publication Data

US 2009/0064549 A1 Mar. 12, 2009

(51) Int. Cl.
*G09F 3/00* (2006.01)
*A47C 7/62* (2006.01)
*B60R 7/06* (2006.01)
*A47K 1/08* (2006.01)

(52) U.S. Cl. ...................... 40/324; 40/320; 297/188.14; 220/737; 224/483; 248/311.2

(58) Field of Classification Search .................. 40/324, 40/320; 297/188.14; 220/737; 224/783; 248/311.2

See application file for complete search history.

(56) References Cited

U.S. PATENT DOCUMENTS

| | | | | |
|---|---|---|---|---|
| 4,872,022 A * | 10/1989 | Schock | 343/806 |
| D353,289 S | 12/1994 | Ayotte et al. | |
| 5,421,638 A | 6/1995 | Ayotte et al. | |
| D365,250 S | 12/1995 | Bergin et al. | |
| D367,997 S | 3/1996 | Ayotte et al. | |
| D368,628 S | 4/1996 | Bergin | |
| D377,439 S | 1/1997 | Ayotte et al. | |
| 5,628,103 A | 5/1997 | Ayotte et al. | |
| D380,125 S | 6/1997 | Ayotte et al. | |
| D380,652 S | 7/1997 | Ayotte et al. | |
| D383,362 S | 9/1997 | Ayotte et al. | |
| 5,709,429 A | 1/1998 | Bergin | |
| D398,127 S | 9/1998 | Bergin et al. | |
| 5,813,644 A | 9/1998 | Bergin | |
| D400,678 S | 11/1998 | Clark et al. | |
| 5,897,041 A * | 4/1999 | Ney et al. | 224/483 |
| 5,938,091 A | 8/1999 | Bergin et al. | |
| D423,836 S | 5/2000 | Bergin | |
| D425,012 S | 5/2000 | Bergin | |
| 6,186,382 B1 | 2/2001 | Bergin et al. | |
| 6,283,551 B1 | 9/2001 | Bergin | |
| D456,691 S | 5/2002 | Bergin | |
| 6,457,772 B1 * | 10/2002 | Forston | 297/188.14 |
| 6,641,101 B2 | 11/2003 | Bergin | |
| D505,032 S | 5/2005 | Bergin | |
| 6,976,735 B1 | 12/2005 | Bergin | |
| 7,090,085 B1 * | 8/2006 | Vicendese et al. | 211/106.01 |
| RE39,392 E | 11/2006 | Bergin | |
| 2004/0118022 A1 * | 6/2004 | Duesler | 40/324 |

* cited by examiner

*Primary Examiner*—Lesley Morris
*Assistant Examiner*—Syed A Islam
(74) *Attorney, Agent, or Firm*—Peter B. Scull; Kristina M. Kalan; Berenbaum Weinshienk PC

(57) ABSTRACT

An advertising apparatus including a body portion adapted to be one or both of connected to or disposed on a support structure accessible for advertising purposes and, an interchangeable and/or replaceable advertising device, the advertising device being adapted to be one or both of connected to or disposed on the body portion.

18 Claims, 30 Drawing Sheets

ADVERTISING APPARATUS AND METHOD

BACKGROUND

The activities of marketing and advertising are important parts of the economy. Effective marketing and advertising introduce and promote products or services that otherwise would not be known to the consuming public. The consumer would typically desire information about a product or service before the consumer would consider purchasing that product or service. Marketing and advertising provide this information to the consumer to thereby inform the consumer about the existence of the product or service and its various attributes.

Public venue advertising is ubiquitous. As a means to promote specific products and generate additional revenue, such venues often will sell space to advertisers. The advertising can be displayed in many ways, such as on billboards, on walls, on electronic displays, on printed material, and other ways. However, because of the often remote (e.g., billboards) or transient (e.g., napkins) nature of these existing types of advertisements, they may fail to adequately grab the consumer's attention, or capture the consumer's eye in a manner that would leave the desired lasting impression. Thus, there appears to be an open niche for alternative advertising methods to accommodate the valuable commercial resource of the immediate visual area directly in front of the consumer in a captive-audience venue.

Cupholders are frequently found in public and private venues where seating is common and beverages are served. Such cupholders are generally positioned so as to be conveniently accessible to the patrons sitting in the seats provided. For example, a typical cupholder position may be in front of the patron or in front of the patron's drinking arm, so that the patron can place their drink in the cupholder when not drinking, and reach their drink easily when desired. Cupholders may be mounted or affixed to the seat backs of the row in front of a patron, so that they are readily accessible to the patron while at the same time not interfering with the comfort of others in the public venue.

SUMMARY

The present disclosure relates to an advertising apparatus and/or method which in some implementations may be or may include a seat supported apparatus, either as a base unit or as a retrofit apparatus, and in some examples may include a cupholder or a cupholder attachment apparatus either having one or more replaceable devices attachable thereto, as in some examples including an insert or inserts, also referred to herein as appurtenant panels and/or emblems. In many instances, either of the devices, whether panels or emblems could be used for advertising purposes, which may be adapted to be installed on existing seats, either as or attachable to or apart from cupholders for improved exposure to the target audience of the advertising. The attachment portion of such an attachment apparatus may in some implementations be adapted to fit into or onto an existing cupholder that has been previously installed on a seat or seatback in the venue. Existing cupholders can have various shapes, and one or more of the cupholder attachment apparatuses described here may be adapted to a variety of existing cupholders.

An advertising apparatus hereof, particularly as a cupholder attachment apparatus can be installed at any time by inserting it onto a preexisting, previously mounted cupholder, where such a cupholder attachment apparatus may latch into place. In some of these implementations, the cupholder attachment apparatus may have one or more snapping or attaching pieces that slide into the cupholder and snap into place on or adjacent a portion of the pre-existing cupholder, as for example latching on or against a bottom cross support structure. An alternative securing or latching device may be used, such as a secondary disk device which may be adapted to engage either or both of a pre-existing cup-holder or fingers of the advertising apparatus itself.

In some implementations of a cupholder attachment apparatus, such may be attached or removed without the use of any special tools. In other implementations, the apparatus may be desirably set as difficult to remove; one or more special tools may be adapted for mounting and/or removal. Such special tools and/or a special method for installing and/or removing such apparatuses may be implemented to avert vandalism as by undesirable removal of the apparatus.

The advertising devices whether as inserts or appurtenant panels and/or emblems may be preattached to the advertising apparatus before installation on an existing cupholder, or may be attached after the advertising apparatus has been installed on the seatback or cupholder or other support structure. When usable with a cupholder, the cupholder functionality would still be accessible to a patron after the advertising apparatus has been mounted in place. Once the appurtenant panel and/or emblem has been installed, or if it has been preinstalled, it would preferably be visible to a patron who would be using that cupholder and in many cases may also be viewable by other patrons of the establishment. The appurtenant panel and/or emblem may carry advertising material to thus add value in informing the patron or patrons of sponsorship or goods or services available to them. The advertising device; e.g., the appurtenant panel and/or the emblem may be removable, replaceable and/or interchangeable with other such panels or emblems carrying different advertising indicia, so that advertising messages may be readily changed upon proprietor desire.

Different versions of advertising apparatus may be installed on the same type or style of seatback, cupholder or other support structure; conversely, the same advertising apparatus may be adapted to be installed on a variety of seats, cupholders or other support structures. Installation and placement may depend on a variety of factors, including the position of the patron, the position of the seat, the type of seat, or the flow of traffic around the seat. The advertising apparatus may be made of an easily moldable material, and the appurtenant panel may also be made of an easily moldable material or often alternatively of a die cut resilient material, so that both advertising apparatus and appurtenant panel may be made in a variety of colors, and adapted to bear whatever advertising is desired. Similarly, an emblem member may be employed of the same or different materials and/or colors and may carry one or more alternative emblems for purposes to be described hereinbelow.

DETAILED DESCRIPTION

The developments hereof relate to an advertising apparatus typically configured to display advertising on an external surface highly visible to consumers. In many implementations, the advertising apparatus is adapted to be attached to a support structure, typically, a support surface which may be found in a captive-audience venue. Such a support surface may in some instances be, or may be on or otherwise associated with patron seats or seating structures, as for example on seat backs or arm rests. In a variety of cases, the advertising apparatus may alternatively be a free-standing apparatus. Some advertising apparatuses hereof may entertain no other functionality, other than providing an advertising surface; whereas, other apparatuses may have built-in alternative functionalities, such as providing containers or supports for patron/consumer items such as drink cups, reading or writing material, programs, writing utensils or other items. In some implementations, the advertising apparatus may be attachable to previously installed consumer item-holding apparatuses acting as the support structure, as for example being a cupholder attachment apparatus adapted to be coupled to one or more of a variety of cupholders. Such a cupholder attachment apparatus may be coupled to pre-existing or to-be-developed cupholders disposed in stadiums, arenas, theatres, or other public or private venues for view by the patrons thereof.

Figure 1A:
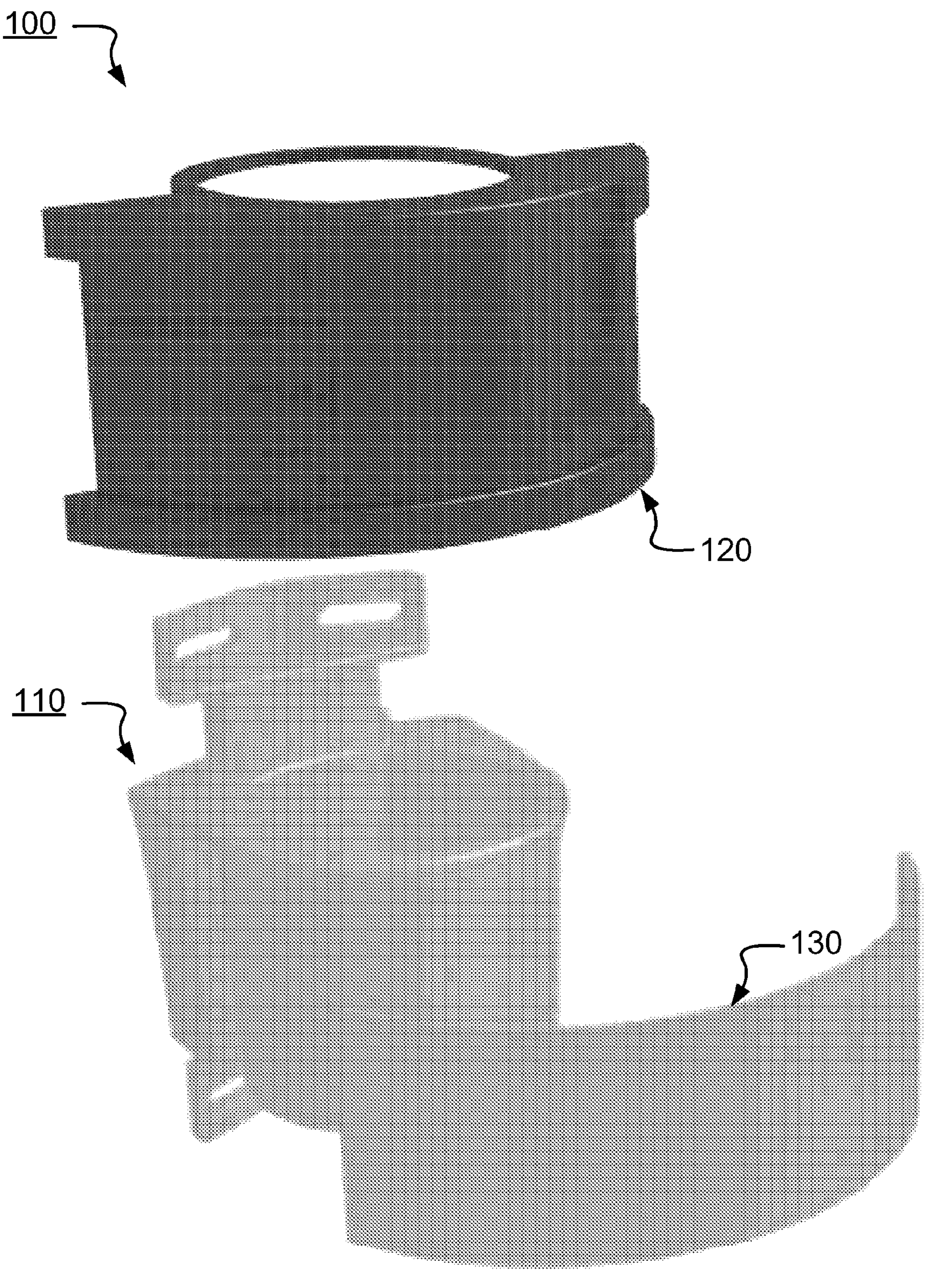
FIG. 1, which includes sub-part FIGS. 1A, 1B and 1C, provides isometric views of an advertising apparatus according hereto, FIG. 1A exploded, FIG. 1B partially exploded, and FIG. 1C fully assembled.

As generally shown in FIG. 1, an implementation of an advertising apparatus which here is a cupholder attachment apparatus 100 may be adapted to be mounted on a substantially conventional cupholder 110 as such may typically be preinstalled in a public venue. The cupholder 110 may be of virtually any suitable sort, and is shown better in relatively isolated form in the exploded view of FIG. 1A.

Figure 1B:
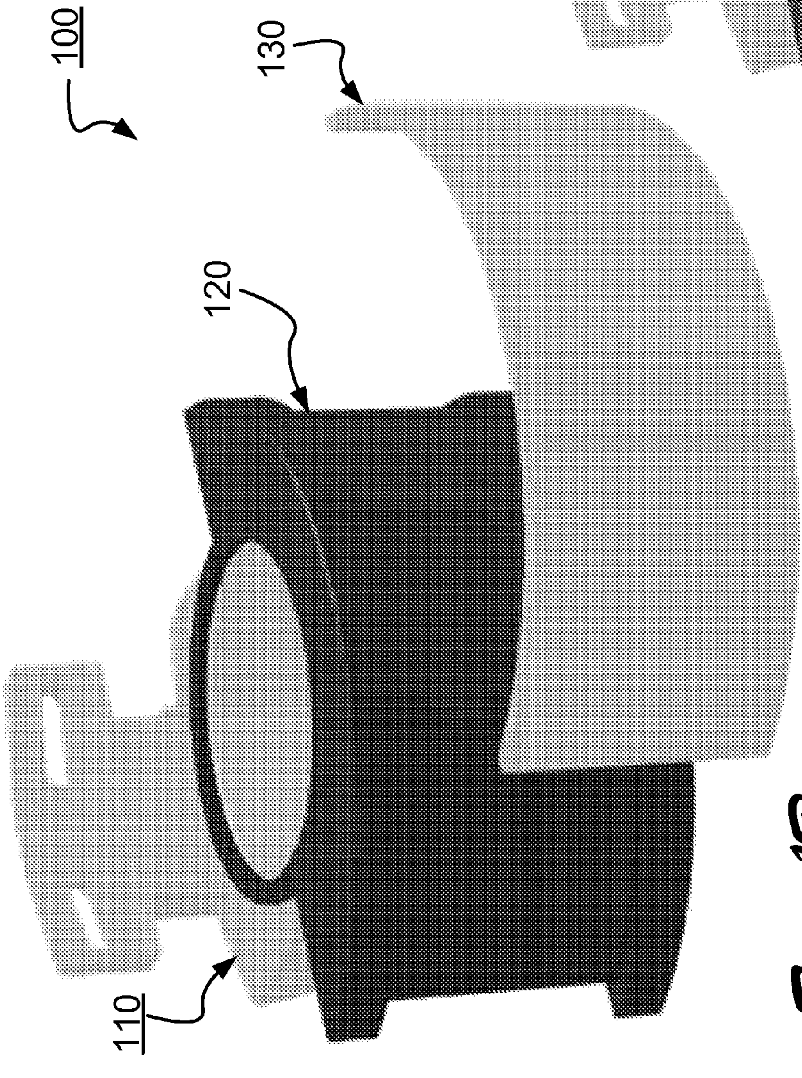
Figure 1C:
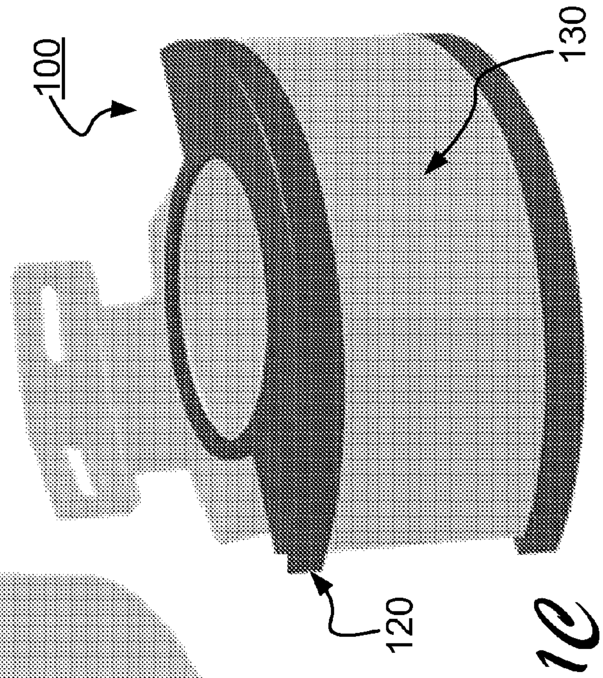

In FIGS. 1A and 1B, this first alternative configuration of an advertising apparatus 100 as a cupholder attachment apparatus 100 is shown with two primary parts, a body portion 120 adapted to be connected to and/or disposed on and/or within a cupholder 110, and an updateable and/or replaceable advertising device, here an appurtenant panel 130 which may be readily adapted for display of advertising material (not shown here, though it could be of a variety of types including e.g., adhesive material stuck on panel 130 (e.g., stickers), or could be reverse printed or imaged on the back side of a clear material to deter scratching or vandalism to the image, or could be removable or could be integrally formed thereon, or as a part thereof). In FIG. 1A, the body portion 120 is not yet attached to a cupholder 110, where in FIG. 1B, the body portion 120 has been set in position relative to the cupholder 110. The appurtenant panel 130 has not yet been attached to the body portion 120 in either of FIGS. 1A and 1B, but, has been so connected in FIG. 1C. Note, the combination of the body 120 with the support structure/cupholder 110 as assembled in FIG. 1B could reflect another implementation where the two parts are not separate, but rather integral such that the advertising apparatus 100 incorporates the support structure therewithin, and/or may also/alternatively incorporate the alternative functionality of cupholding, or other item holding. The advertising apparatus thus need not be attachable to other functional devices for support, but, may rather be self supporting, providing advertising functionality with or without other functionality.

Figure 2A:
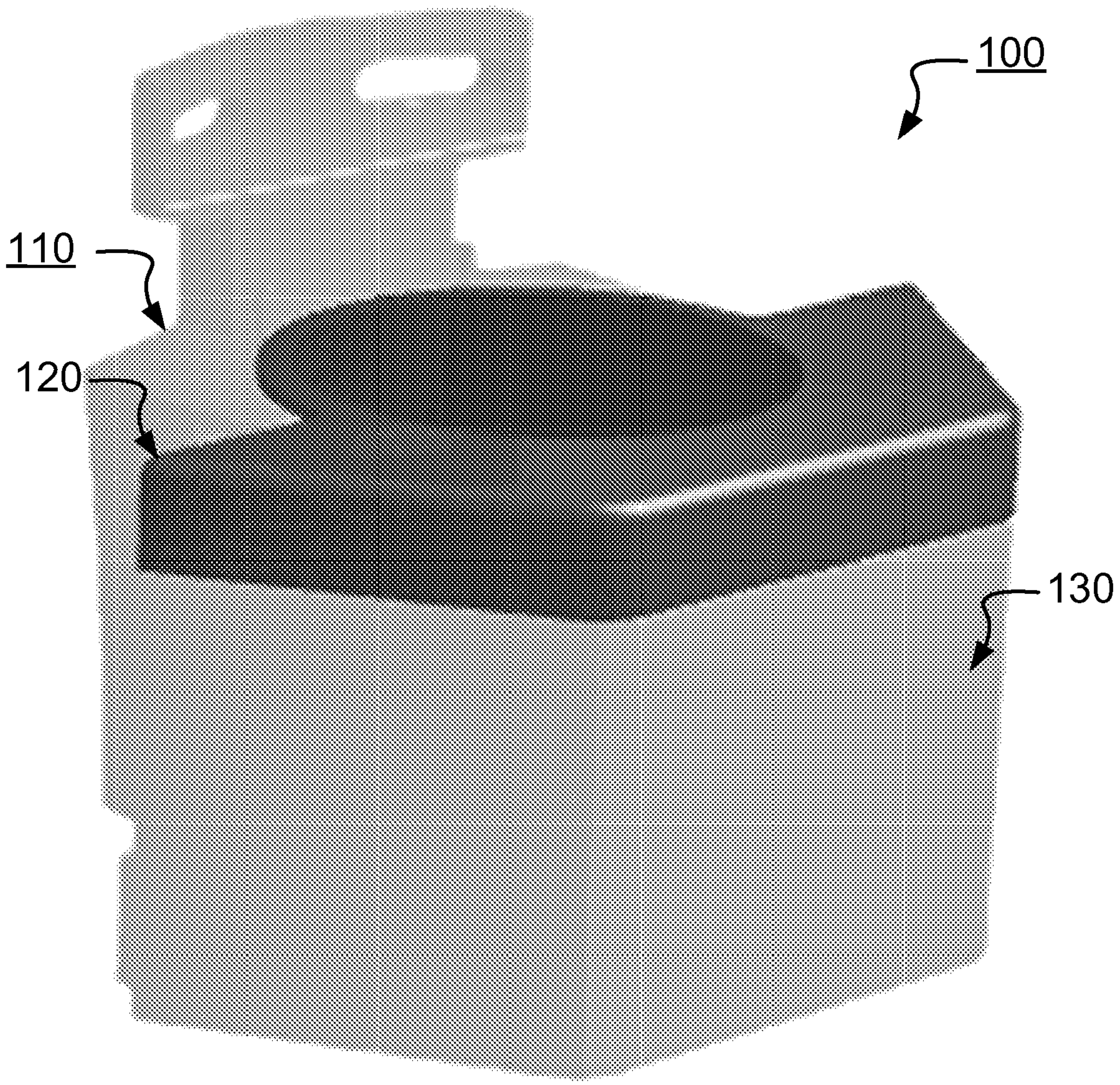
FIG. 2, which includes sub-part FIGS. 2A and 2B, provides isometric views of an alternative version of an advertising apparatus with a multiplanar advertising panel, FIG. 2A fully assembled, and FIG. 2B exploded.
Figure 2B:
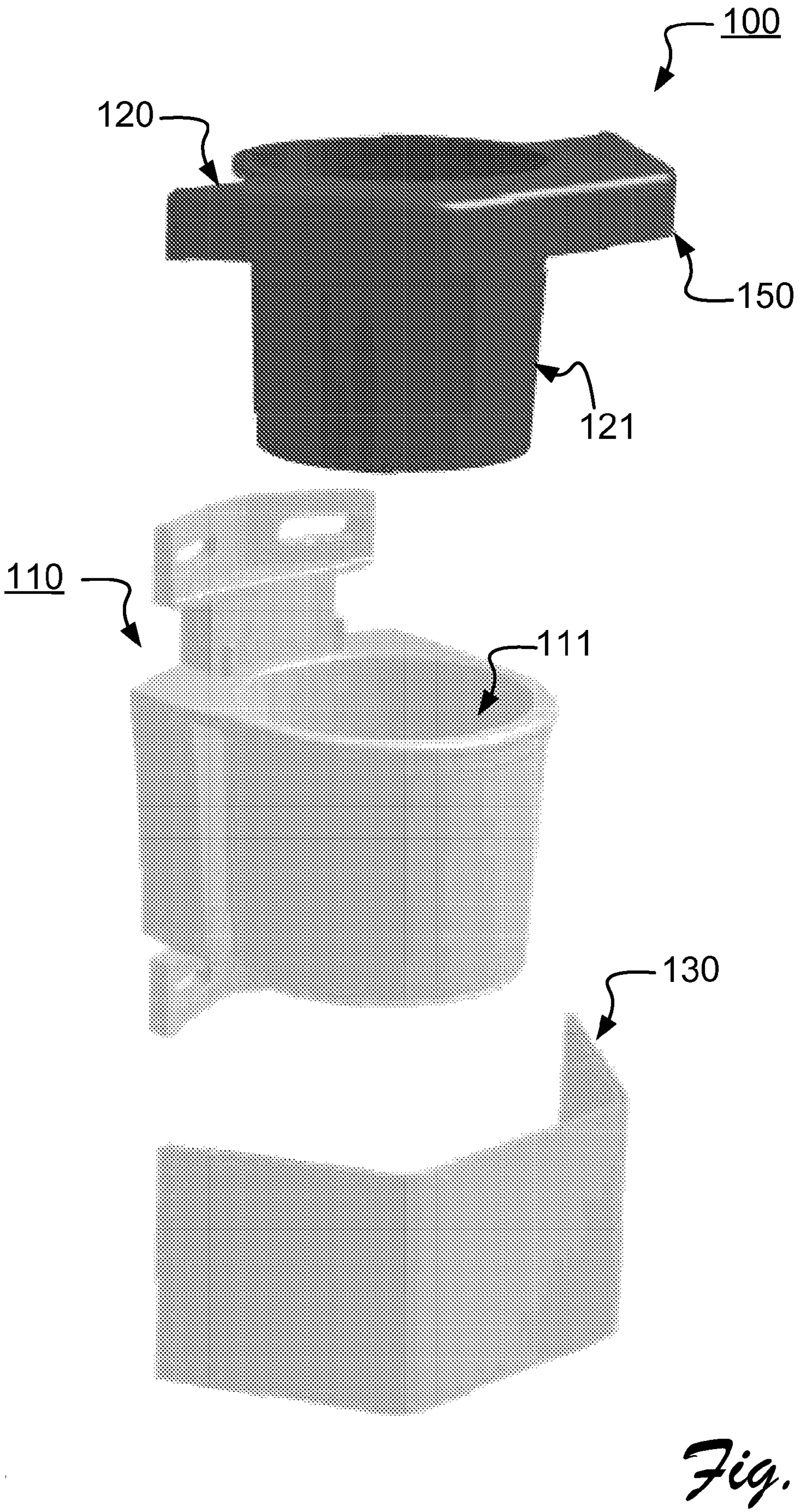

In the alternative depiction of FIG. 2, an angularly-disposed appurtenant panel 130 is mounted on a corresponding body portion 120. In FIG. 2A, the two parts are connected, where in FIG. 2B, they are shown in exploded view relative to a cupholder 110. Note, the angular disposition may be preformed into and thus be a part of the appurtenant panel 130, or it may be that the panel 130 is not so pre-formed, but may then be flexible enough that a pre-formed channel of the body portion 120 may force the angular disposition shown. Other alternatives may also achieve similar ends. It may also thus be noted that a cupholder or cupholder attachment apparatus 100 according hereto may have a variety of configurations and shapes, including but not limited to varieties including presentation of angular or curvilinear advertising panels, like or not those of FIGS. 1 and 2. An angular disposition such as this shown in FIG. 2 may provide multiple alternative viewing surfaces for patron viewing from alternative angles/dispositions, and/or for presentation of alternative display indicia on alternative display surfaces of the apparatus. Such alternative surfaces can thus increase viewing opportunities and/or provide for multiple branding or sponsorship presentations per apparatus, which with such angular surfaces can provide for different brand presentations on each of substantially discrete surface areas. In the implementation of FIG. 2, three such areas are shown, these also being updateable and/or replaceable as described herein.

When attachment to a pre-existing cupholder is desired, a cupholder attachment apparatus 100 may be mounted upon the cupholder 110 as shown in FIGS. 1 and 2 through the coupling of the body portion 120 of the cupholder attachment apparatus 100 with the cupholder 110. The appurtenant panel 130 may be disposed on a generally front side of the cupholder attachment apparatus 100, the front side being defined as the user visible portion opposite the back portion of the cupholder 110 which is used for attachment to a seat or other support structure and/or being defined by that which may be visible to a patron/potential consumer. As shown better in FIG. 2B, a depending portion 121 of the body portion 120 of the cupholder attachment apparatus 100 may be adapted to be positioned within the cup-holding portion 111 of a cupholder 110. Thus, connection of the body portion 120 to the cupholder 110 may be achieved via insertion of a mounting portion, here the substantially cylindrical mounting portion 121, or through other mechanisms, some non-limitative examples of which being described in further alternative implementations herein below. An overhang portion 150 of the body portion 120 may extend substantially perpendicularly out and/or away from the mounting portion 121, and thus hang over the top and one or more of the sides of the cupholder 110. Such an overhang portion 150 may have a receiving portion 155 (not shown in FIG. 2B, but see FIG. 3 described below) adapted to receive the appurtenant panel 130.

As shown in the further implementation of FIG. 3, a further curvilinear option of a body portion 120 is shown for receiving a curvilinear appurtenant advertising panel 130 not unlike that of FIG. 1. As before, the advertising panel 130 (not shown in FIG. 3, but see description relative to FIGS. 4 and 7 below) may be connected to a body portion 120 at or adjacent an overhang portion 150. A variety of methods for such attachment are available, some of which being further described below. As introduced above, a receiving portion 155 is identified in FIG. 3 for receiving the appurtenant panel 130. A further optional advertising device, also referred to herein as an emblem member 140 may be adapted to be disposed on the upper surface and/or on a side surface, typically the front side, of the body portion 120, covering a portion of the upper surface of the body portion 120 and typically also covering a portion of the exterior surface of the appurtenant panel 130, if the two advertising devices are used together.

Figure 3A:
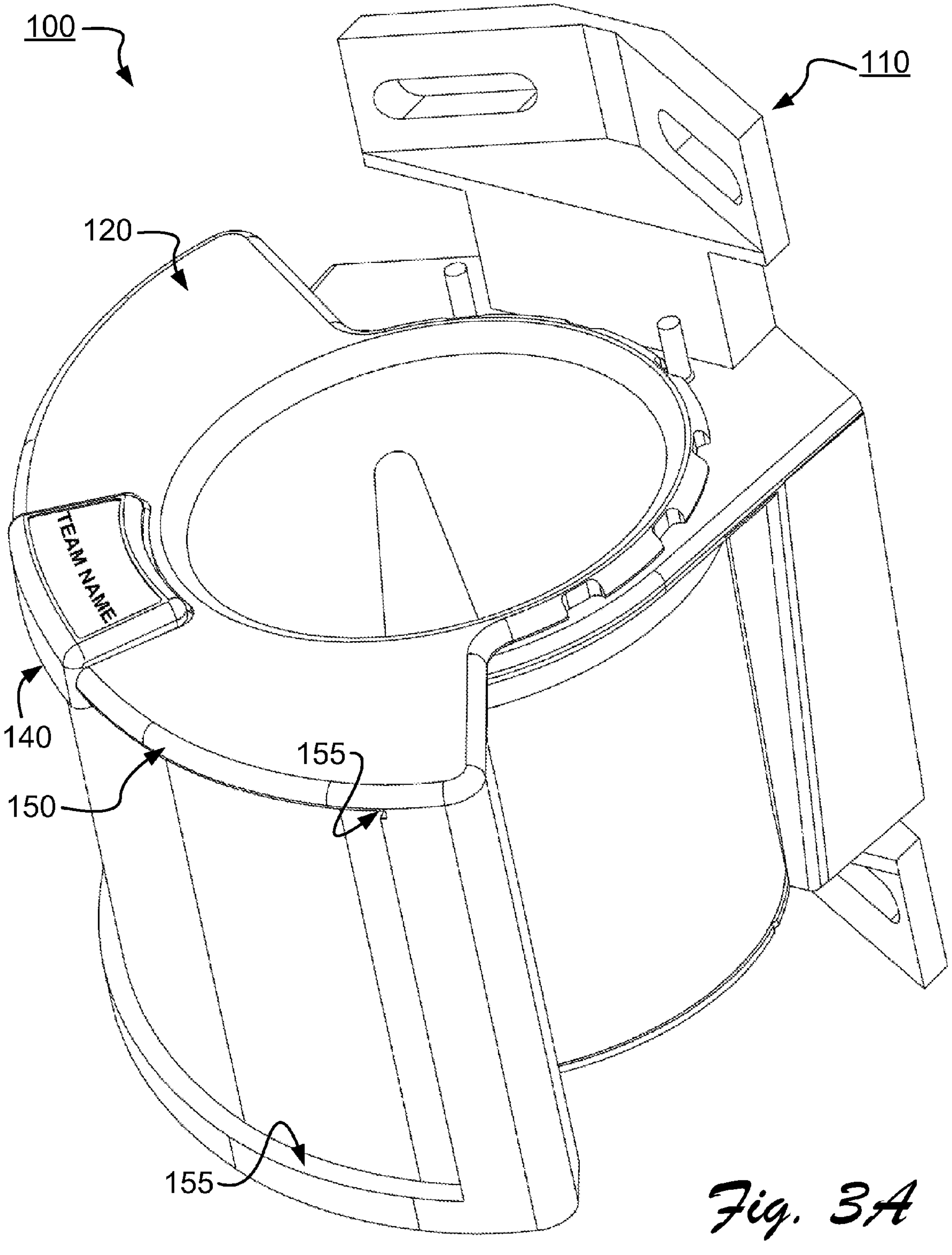
FIG. 3, which includes sub-part FIGS. 3A, 3B, 3C, 3D and 3E, provides isometric views of an alternative advertising apparatus mounted in place on conventional alternative drink cupholders.
Figure 3B:
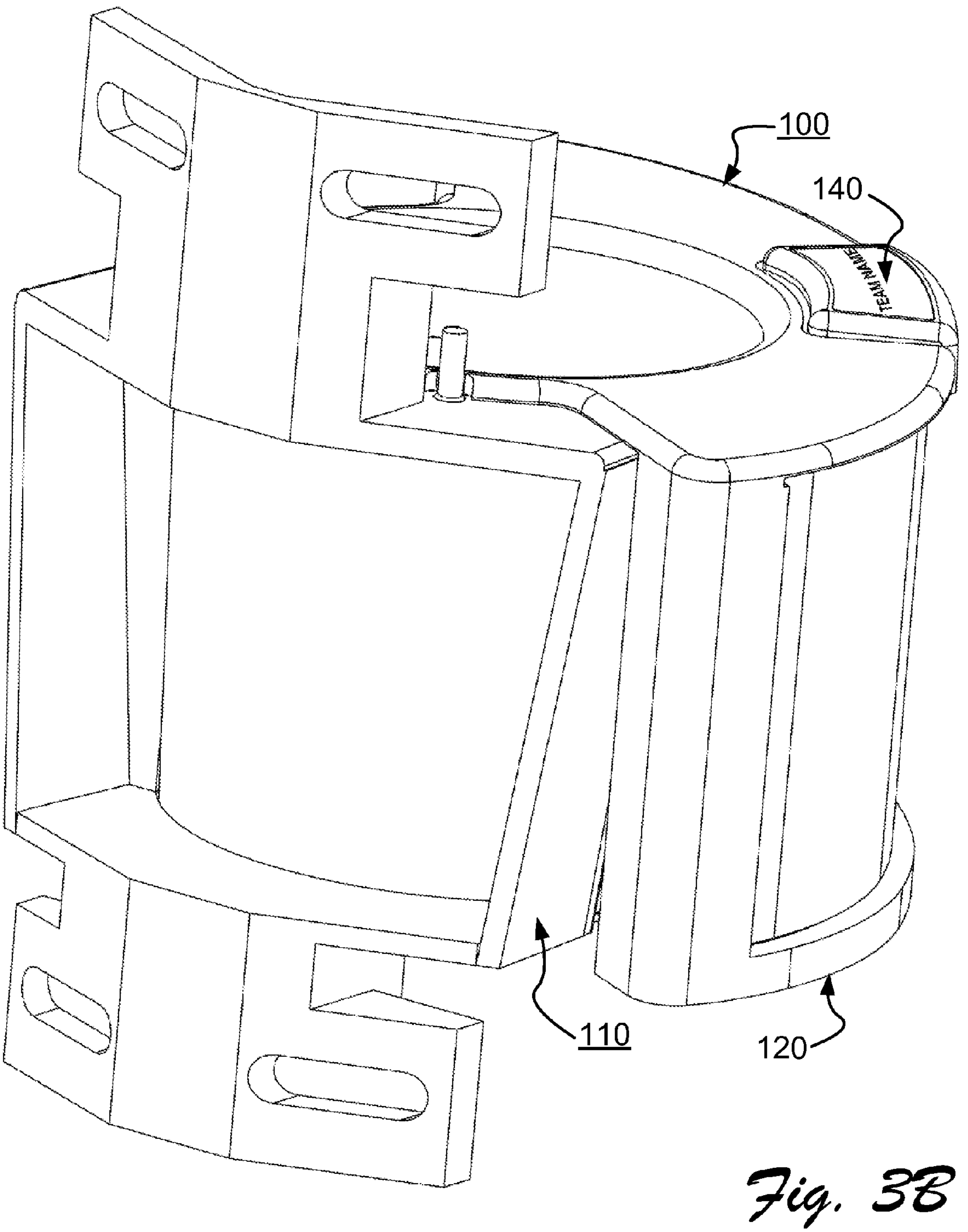
Figure 3C:
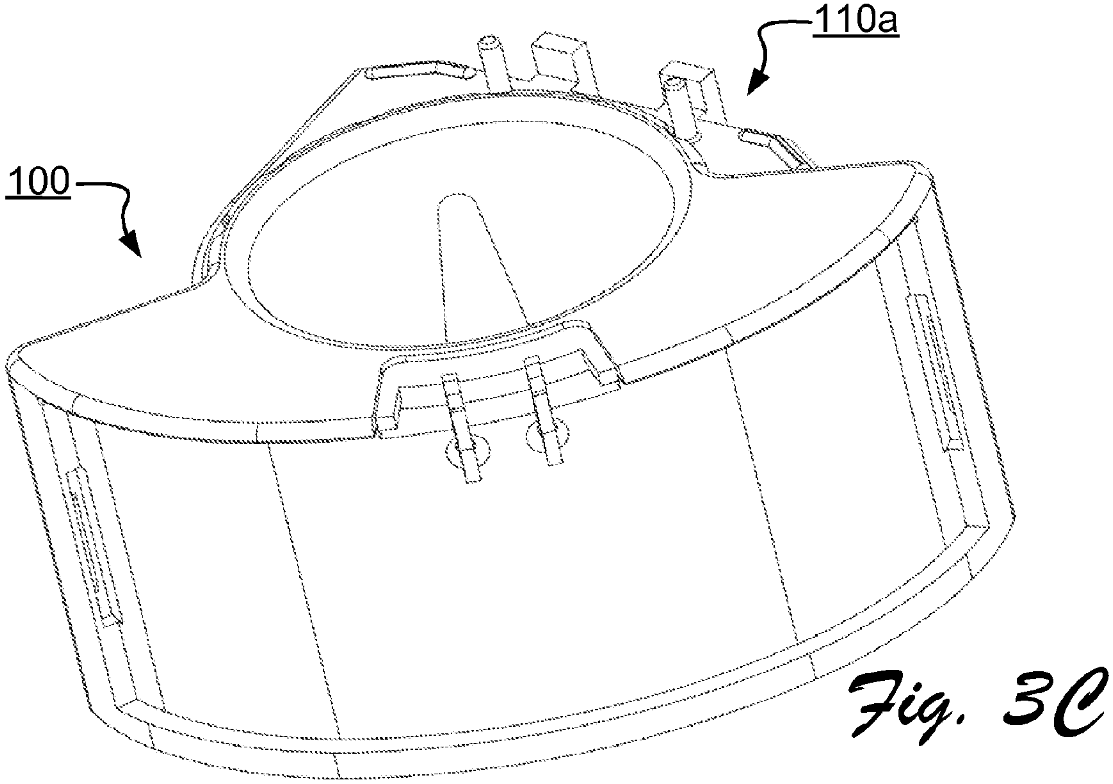
Figure 3D:
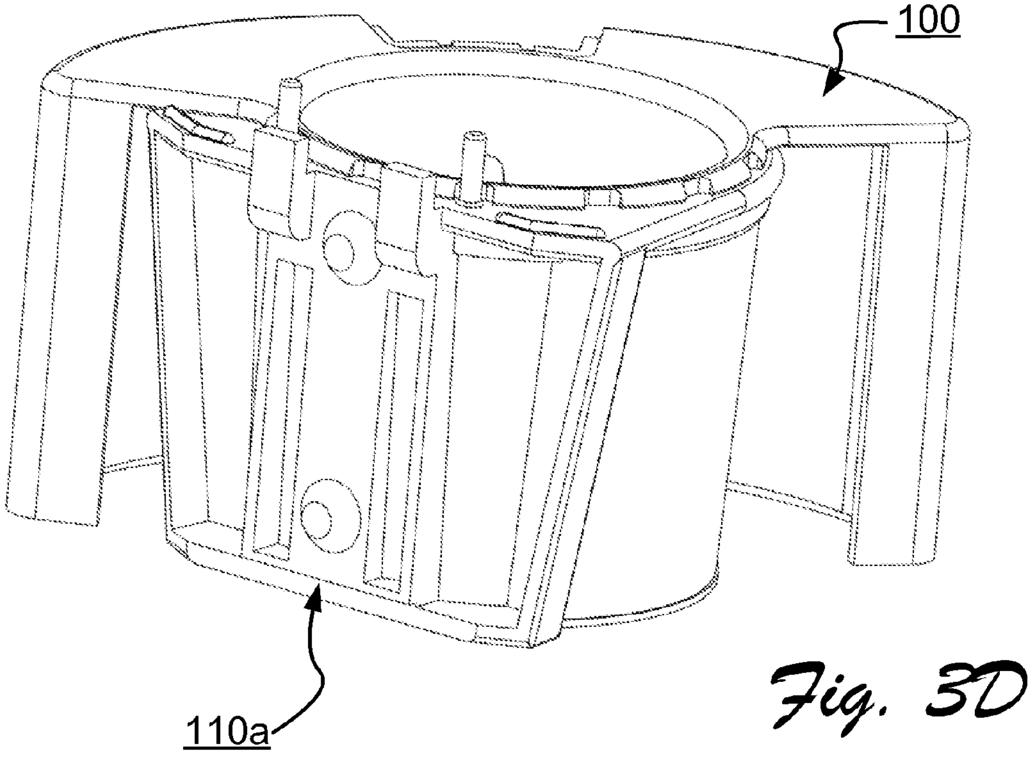
Figure 3E:
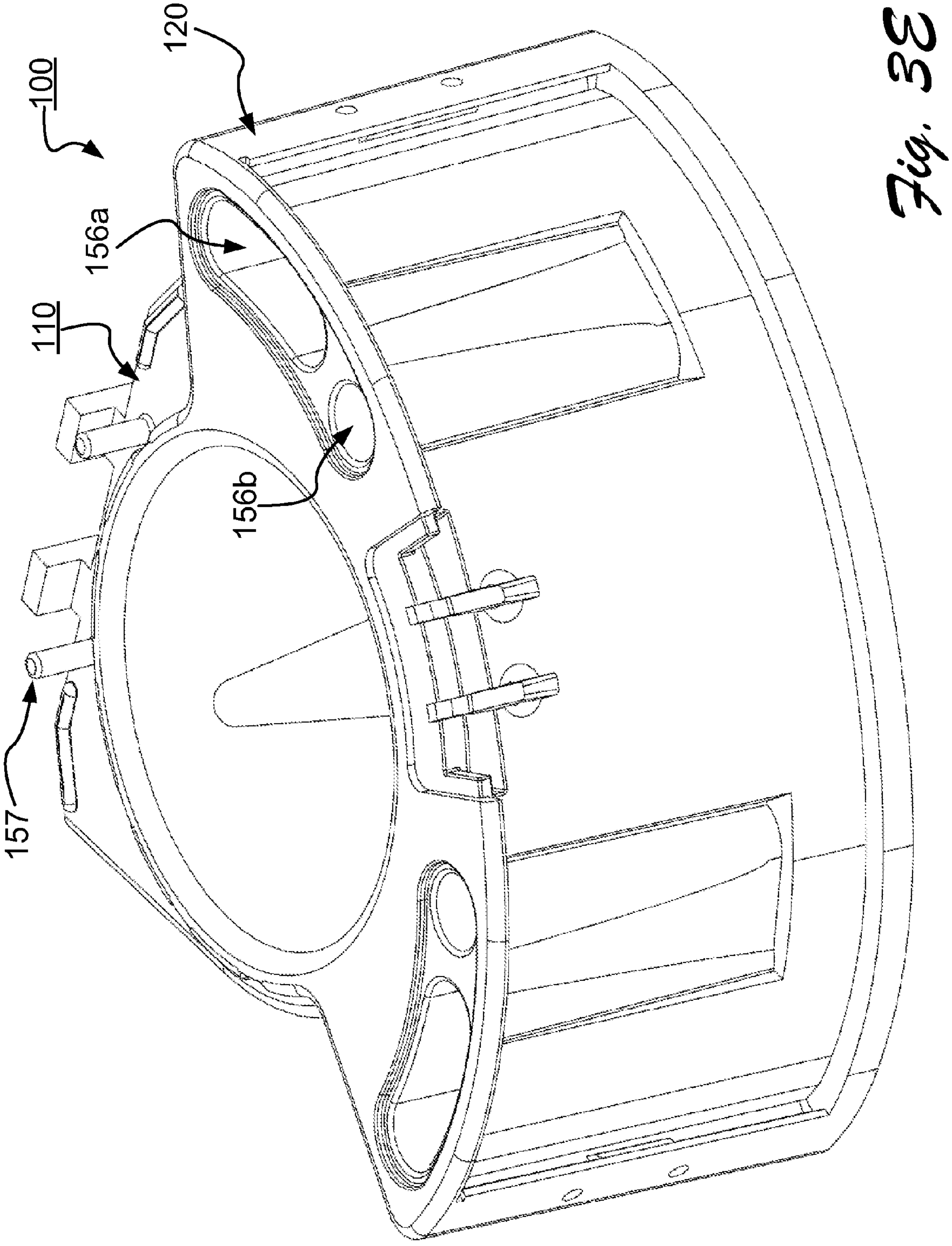

More specifically, FIG. 3A provides a relative front/side view of an apparatus 100 wherein FIG. 3B provides a rear view of such as may be attached to a particular cupholding device 110. FIGS. 3C and 3D provide respective front and back side views of an apparatus 100 in a discrete different cupholding device 110*a*. Other devices 110 (not specifically shown in FIG. 3) may also be used herewith or with other adaptations hereof as will be appreciated in or by the art. Still further options are shown in FIG. 3E, including the cupholder attachment apparatus 100 having one or more functional or decorative openings (holes or cavities or otherwise) such as the two types of illustrated openings 156*a* and 156*b*, potentially adapted for holding sundries such as written or writing materials, a program, a ticket, brochures or menus, or writing utensils (pencils, pens or paper) or other personal goods. Note also the adaptability to have a prong 157 for the hanging of items such as keys, binoculars, phones, tickets (on, e.g., cords), radios and/or MP3 players, inter alia (note, the prong 157 may be on and extend from the cupholder itself, or on the attachment apparatus 100 hereof, or on both if the two form an integral unit as introduced above). Alternatively, the prong or plural prongs or a further alternative form of protrusion (not shown) may be formed in/on the rear area for holding printed or writing materials such as a program, brochure, menu or paper.

A variety of alternative may be used for retrofitting an advertising apparatus to a pre-existent support structure such as a cup holder. In some examples, glues, epoxies or other substantially permanent connections may be used. In others, snaps, sleeves or other mechanical fastening devices or methods may be used. Many implementations may involve installation on cup holders without need for removal of the cup holder from the seat on which it may be installed. Further, many implementations may be adapted for installation without need for special tools (though some may desirably require such tools for either or both of installation and/or removal). A variety of these implementations for installation may be adapted to be substantially quick and/or fast and efficient, or be substantially simple in installation procedure.

For some implementations for retrofitting an advertising apparatus to a pre-formed cupholder or other support structure, a first alternative arrangement 200 for connection of an advertising apparatus 110 to a cupholder or other support structure is shown in FIGS. 4 and 5. In this implementation, an arrangement 200 includes a disk 210 with one or more clip members 220, see FIGS. 4 and 5, which would engage the cross brace 115 of the cupholder 110 (see for more detail, FIG. 5, described below). The clip members 220 are here disposed in opposed relationship to each other to provide for a twist effect for engaging the cross brace 115. The disk 210 may then cooperatively act with the inward turned flanges 123 of the insert fingers 122 to hold the body portion 120 of the device 100 in place relative to the cupholder 110. Note, though a substantially circular disk is shown and described here, other alternative shapes may be used as well, as for example a single elongated member with depending clips, or a cross member or winged or other shaped member with clips depending therefrom.

Figure 4A:
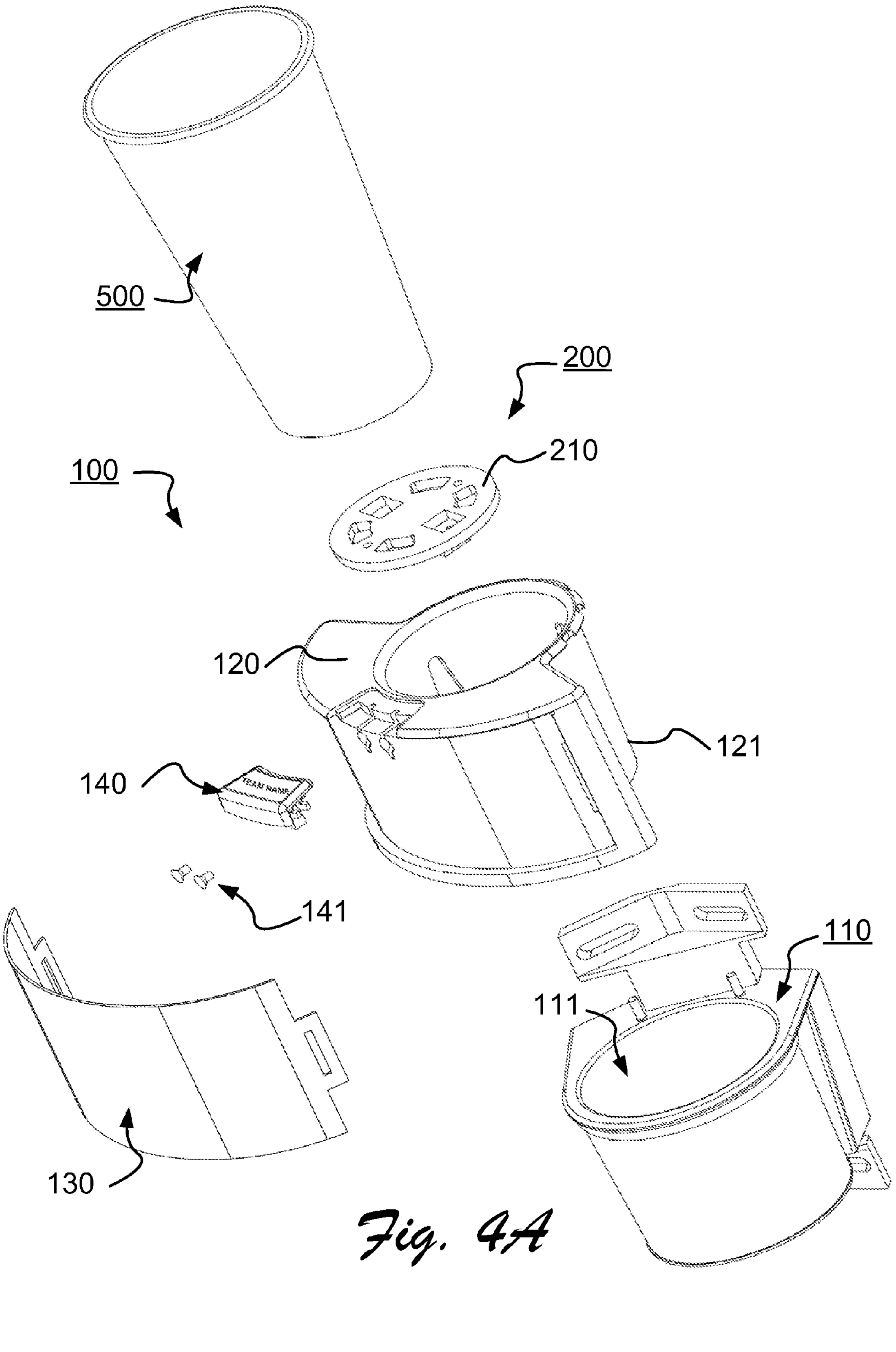
FIG. 4, which includes sub-part FIGS. 4A and 4B, provides respective exploded isometric views of an advertising apparatus hereof both with and without a cupholder combination such as is shown in FIG. 3, here showing an unmounted advertising apparatus with an appurtenant panel, an advertising emblem member and a connection arrangement.

In more detail, what is shown in FIGS. 4 and 5 are views of an advertising attachment apparatus 100 including respective exploded pre-mount and mounted views of the attachment apparatus 100 in a position for which it may be adapted to be connected to the cupholder 110 (note, shown also is a drink container or cup 500 in FIG. 4A which could be inserted in the cupholder 110 before or after connection of an attachment apparatus 100 to a cupholder 110). FIG. 4A shows also that the appurtenant panel 130 may be detachable from the body portion 120, noting that this may be attached to the body portion 120 by a variety of methods and/or devices. Further, an emblem member 140 is shown which may also be adapted to be integrated with or attached to the body portion 120 (note, the mounting screws 141 which may be used for this purpose) to complete an assembly of an attachment apparatus 100 according hereto to provide additional advertising space.

Figure 4B:
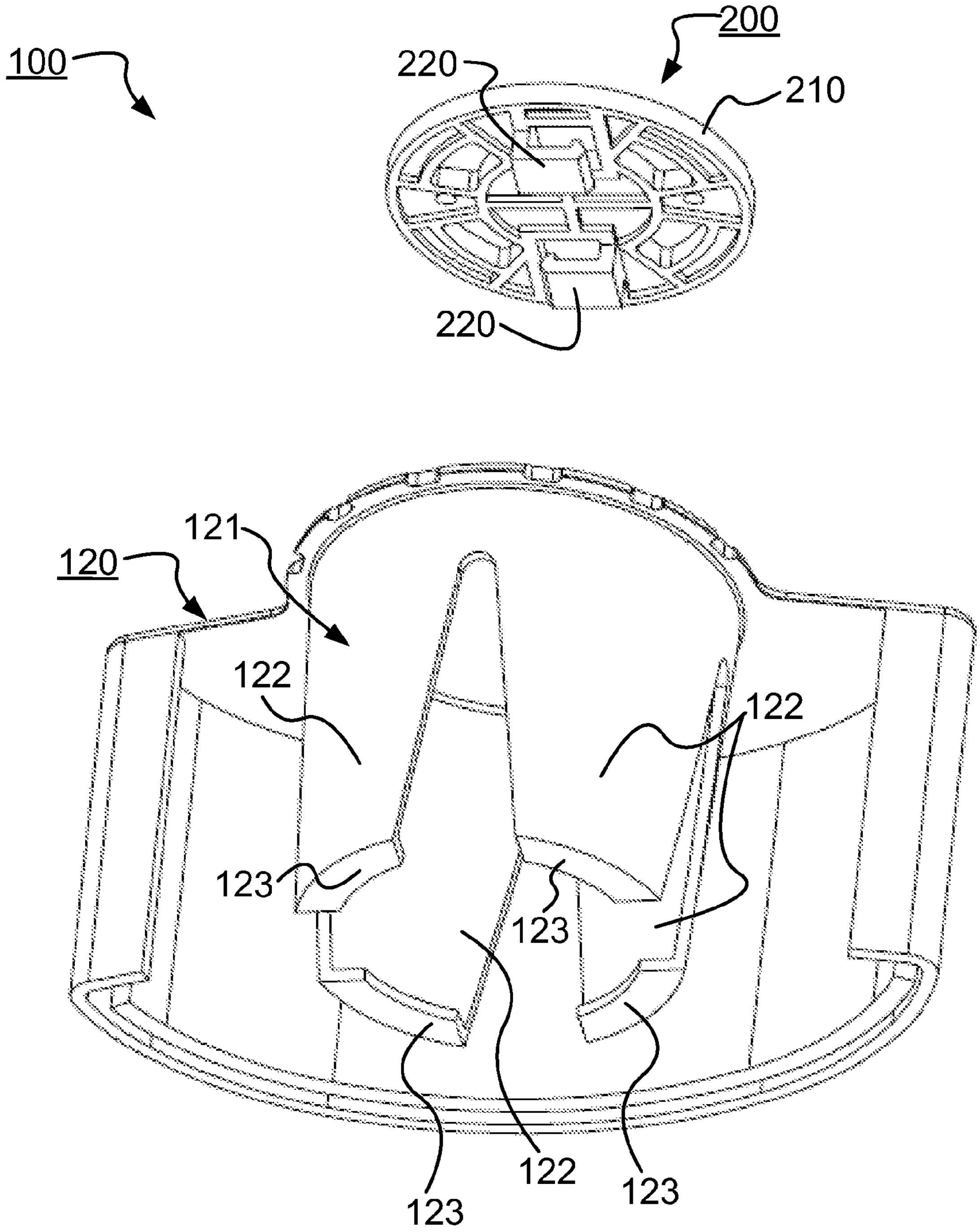
Figure 5A:
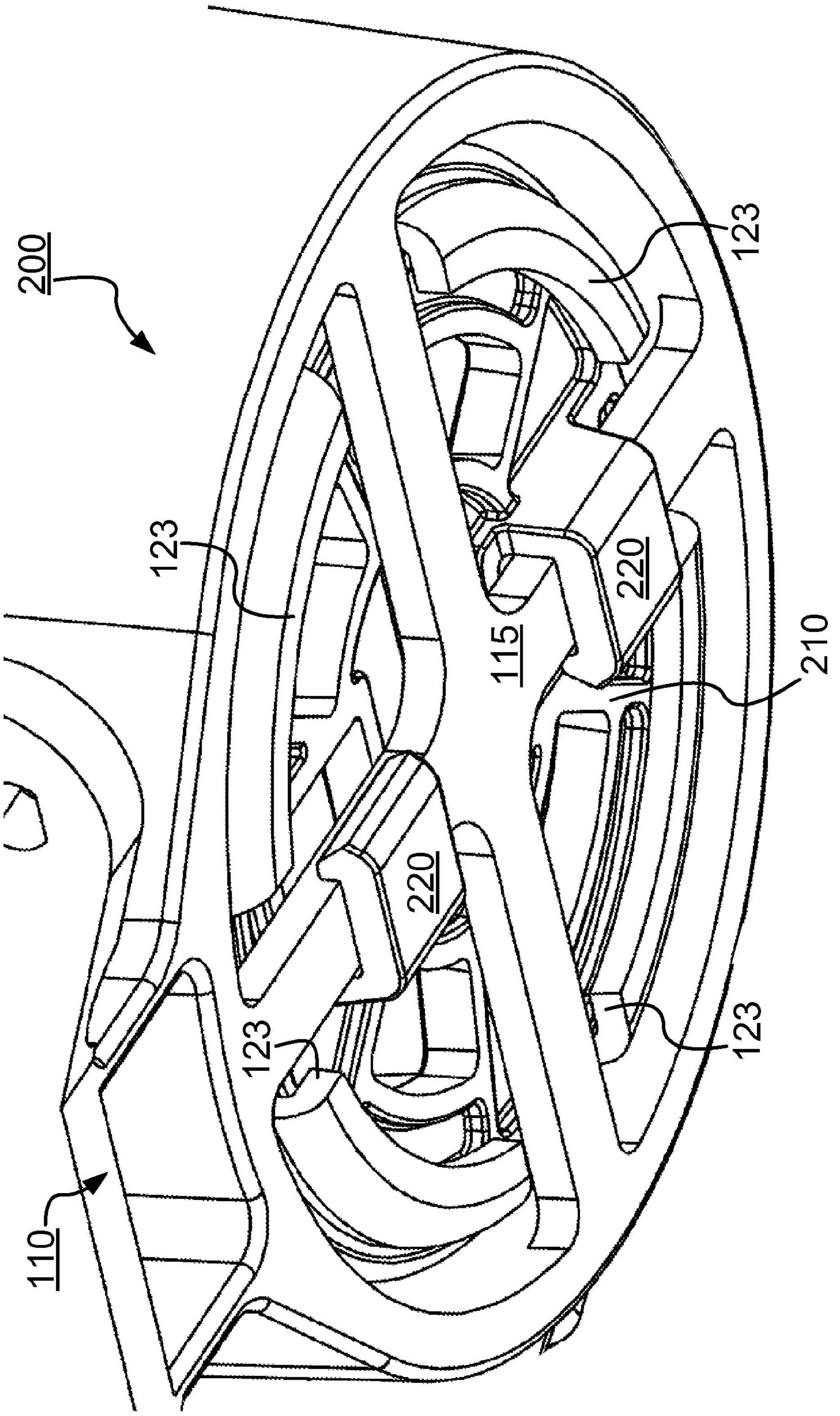
FIG. 5, which includes sub-part FIGS. 5A, 5B, 5C and 5D, provides isometric, plan and cut-away views of a connection of an advertising apparatus and a cupholder or other support structure.
Figure 5B:
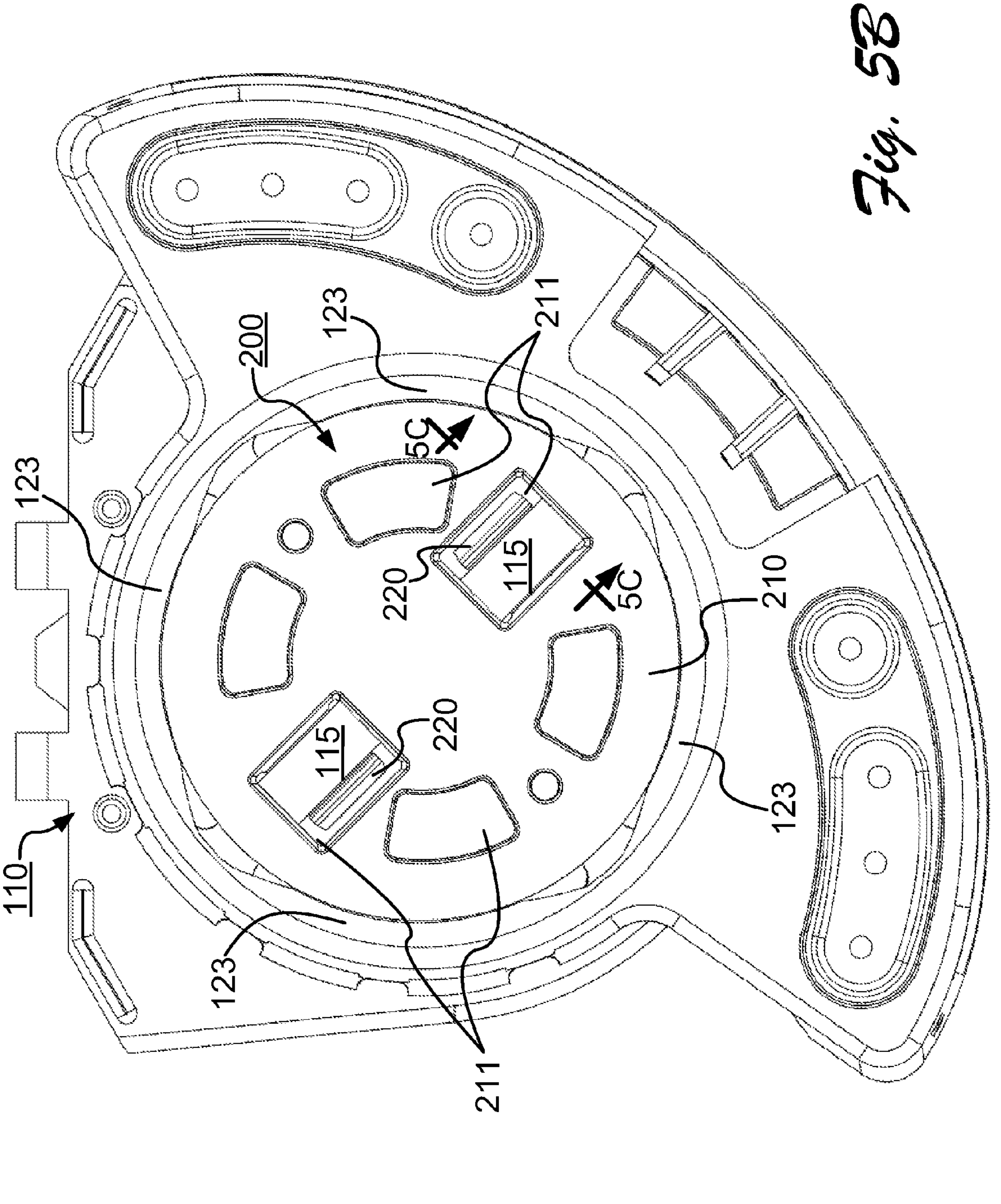
Figure 5C:
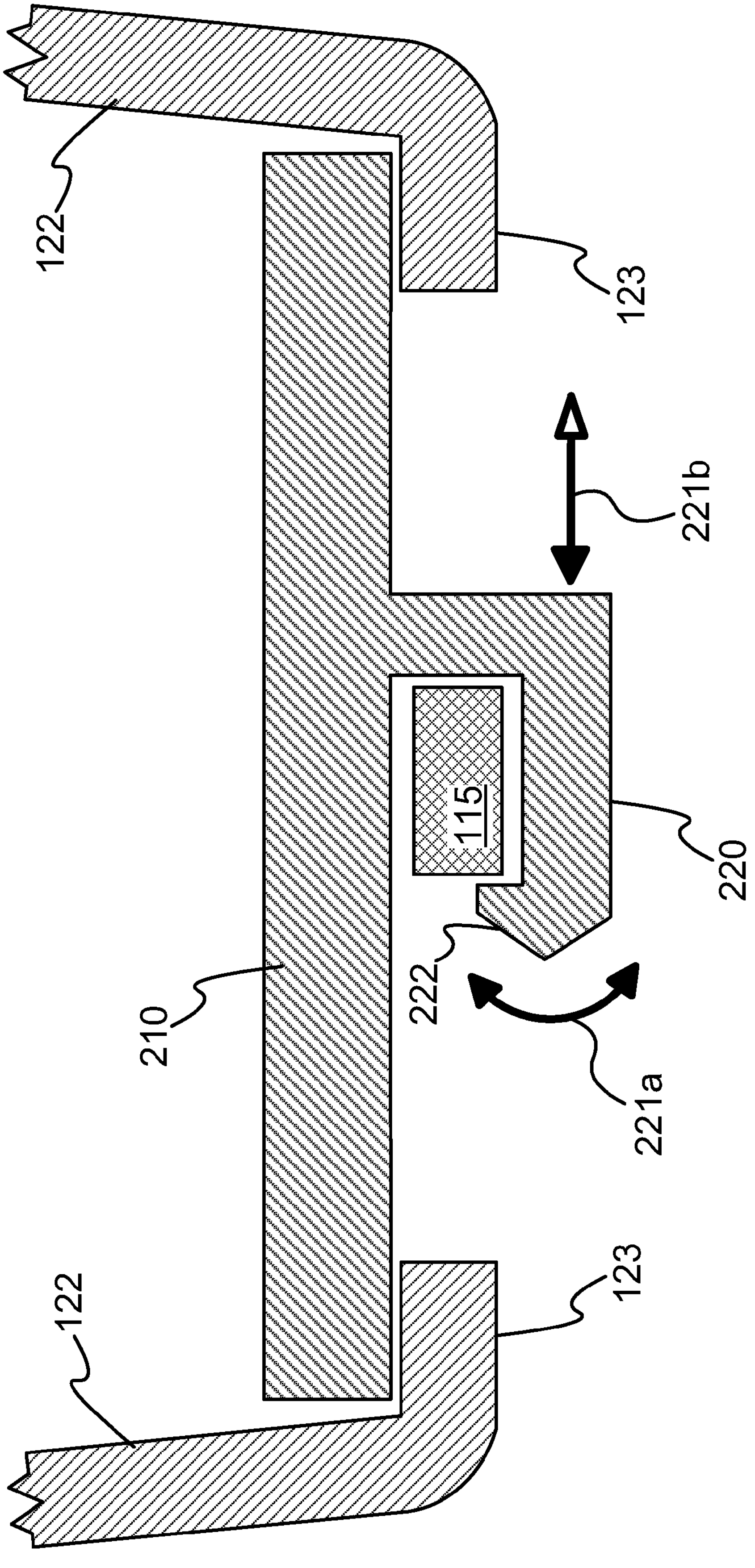
Figure 5D:
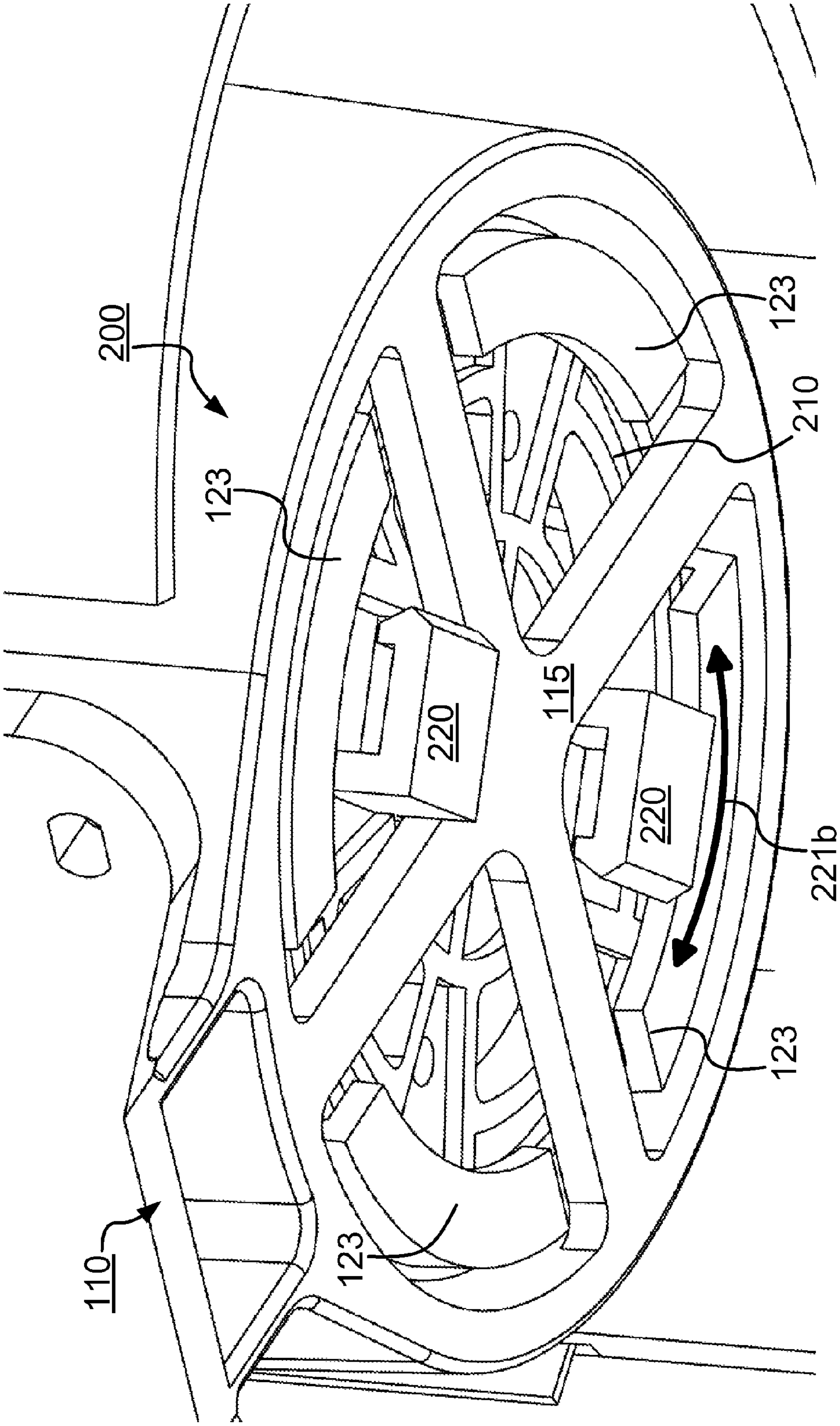

As generally indicated in FIG. 4A, prior to its assembly with the cupholder 110, the body portion 120 would be aligned with the cupholder 110 via the cupholder opening 111 thereof for coupling to the cupholder 110 via insertion of the insertable portion 121 into the cupholder opening 111. FIG. 4A also shows one implementation of an attachment system 200, here including a rotatable disk 210 which will be further described below. FIG. 4B also shows the disk 210 from an arbitrarily designated underside thereof, with two clip members 220 disposed thereon. Also shown in FIG. 4B are more details of this one implementation of an attachment system, here also showing a depending portion 121 of the body 120 of the apparatus 100. More particularly, included here are a plurality of legs or insertable members 122 which each have flanges 123 disposed thereon. As can be seen here, the flanges are inwardly turned to co-act with the connection device 210 as described below.

FIG. 5 provides a variety of views of a connection of an apparatus 100 to a cupholder or other support structure 110. In FIGS. 5A and 5B, the advertising apparatus 100 from the exploded views of FIG. 4 is shown as inserted in a cupholder 110 with the inwardly turned flanges 123 not engaged with the cupholder 110 itself. Rather, the disk 210 is inserted also in the cupholder and is engaged with a cross bar portion 115 of the cupholder 110 via the clip portions 220 which catch on and are secured in place relative to the cross bar 115. The engagement of a clip member 220 relative to the cross bar 115 is shown in isolated detail in the cut-away cross-section of FIG. 5C (cross-section taken on line 5C-5C of FIG. 5B) where the clip member 220 is shown engaged with the cross bar 115. In many implementations, the clip member 220 would have been rotatably deformable or resilient to move in a fashion such as is depicted by the double-headed arrow 221*a*, particularly when initially engaging a crossbar portion 115 as depicted by the double-headed movement arrow 221*b*. More specifically, during initial engagement, prior to actual engagement, by movement of the clip 220 in the solid arrowhead direction (here arbitrarily leftward) of the double-headed arrow 221*b* (note, FIG. 5D shows a rotational movement 221*b* of the clip 220 relative to the crossbar portions 115 and the flanges 123 to effectuate such a translational motion as depicted in FIG. 5C), the angular face 222 of clip 220 would engage the surface (here arbitrarily the undersurface) of the crossbar portion 115 and thereby cause the deformation of the clip 220 away from (here downwardly) relative to the cross bar portion. If resilient, this deformation will remain until sufficient leftward movement is achieved to disengage the face 222 and allow achievement of the secured clipping position shown in FIG. 5C. (Note, this may be a substantially permanent connection and/or a reverse disengagement may be achieved in some implementations through use of some initiating force on the clip portion 222 to disengage the clip and allow reverse motion (open arrow head of 221*b*)). A tool 600 to assist with installation and/or removal of such a connection disk and/or system is described in more detail in FIG. 6 below.

The clips 220 thereby hold the disk 210 in place relative to the cross bar 115, and thus in position relative to the cupholder 110. In turn, the undersurface of the disk 210 engages the upper surfaces of the flanges 123 of the legs 122 of the inserted body 120 to hold the body in position relative to the cup holder or other support structure 110, secure from unwanted removal. Thus, a retrofit advertising apparatus 100 may be achieved which can be attached to a support structure such as a cup holder 110 so long as it has appropriate crossbar portions 115 for engagement with the clips 220.

Figure 6A:
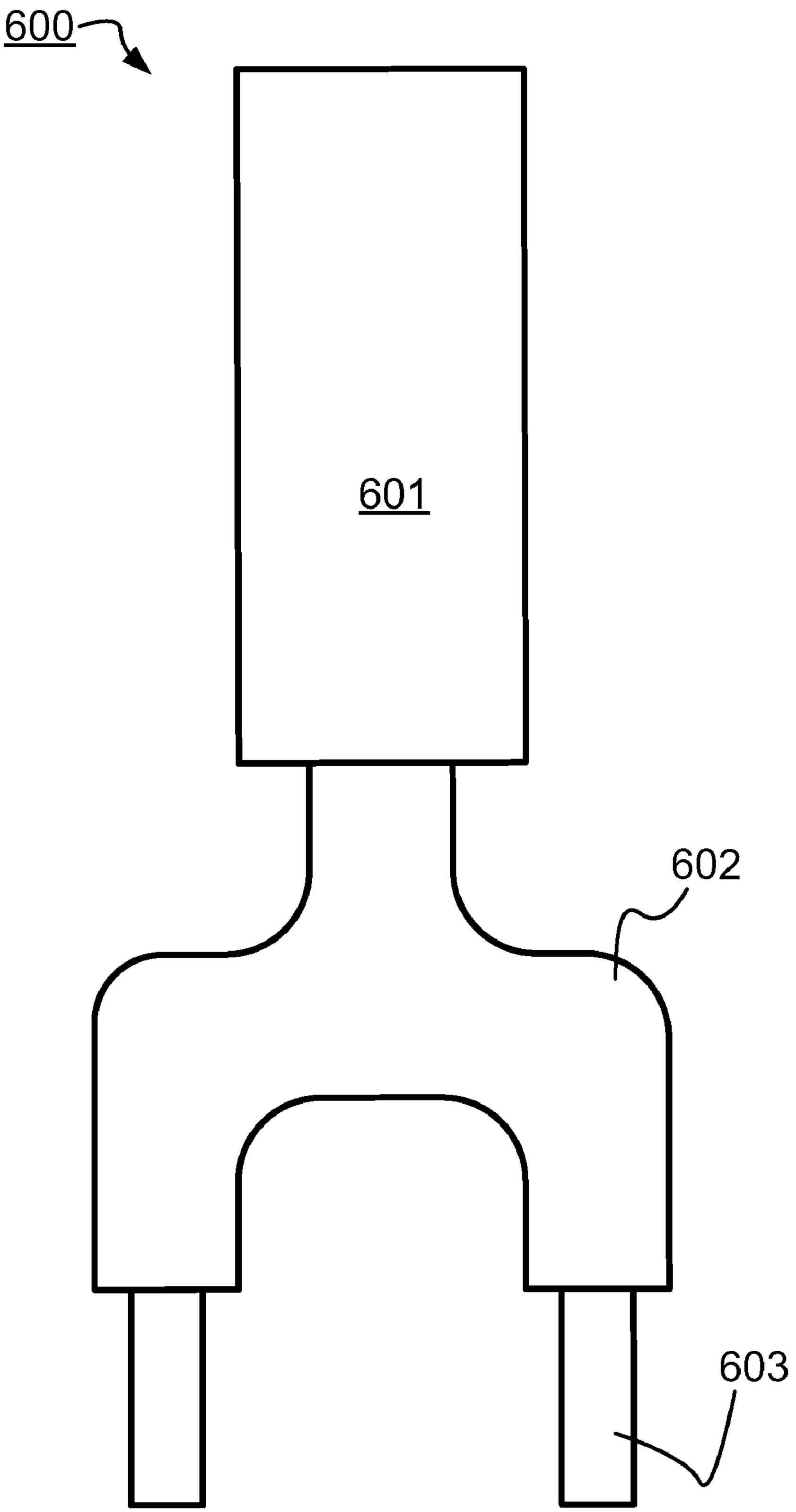
FIG. 6, which includes sub-part FIGS. 6A, 6B and 6C, provides elevational and isometric views of a tool for use in applying and/or removing an advertising apparatus such as those shown in FIGS. 4 and 5.
Figure 6B:
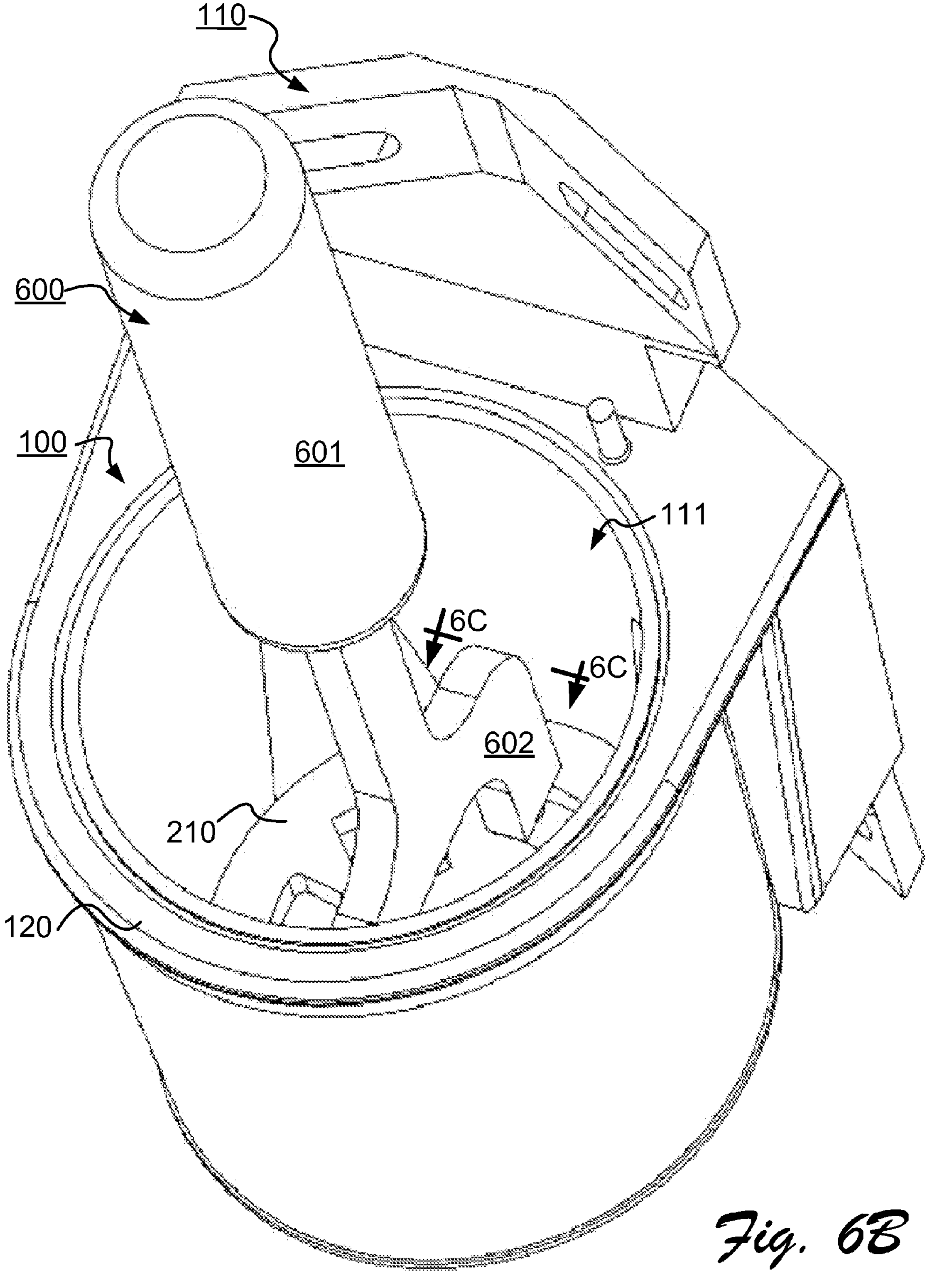
Figure 6C:
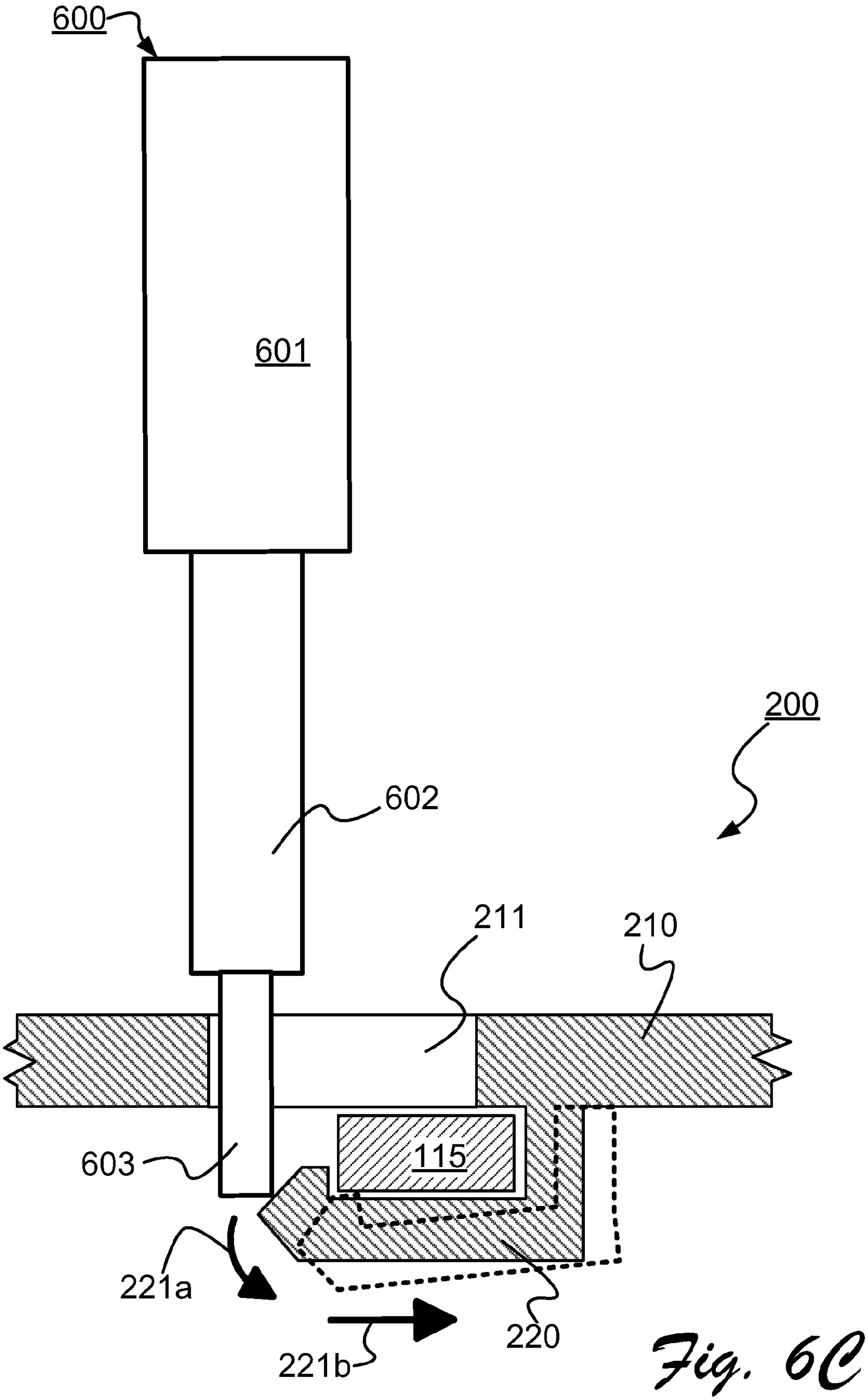

FIG. 6 provides views of a tool 600 which may be used with the connection arrangement 200 of an attachment apparatus 100. In general, and as shown in FIG. 6A, the tool 600 includes a handle 601, one or more legs 602 connected to the handle 601 and one or more respective clip-engaging portions 603 connected to the respective leg portion 602. FIG. 6B provides a view of a tool 600 inserted in the receiving area 111 of a support member 110 to engage a disk 210 of a connection arrangement 200. Then, as shown in side partial cross section of FIG. 6C (taken on line 6C-6C of FIG. 6B), the tool 600 can be used to engage a clip member 220 of a disk 210. As indicated in some earlier views (see FIG. 5B, e.g.), the disk 210 may have one or more apertures 211 into and through which a clip engaging portion 603 may be inserted. Then, the clip-engaging portion 603 engages the clip 220 and may then be used to force the resilient deformation of the clip 220 moving it in direction 221*a*, bending down and away from the crossbar piece 115. Then, by rotation of the tool and/or the disk 210 (the tool may be used to cause rotation of the disk 210), then the clip 220 may be moved in direction 221*b* under and in disengagement of the clip off the cross bar 115. Such action would provide for removal of the disk and thus also of the apparatus 100 from the support structure 110. An opposite action (not specifically shown), i.e., movement of the disk and clip 220 in the opposite direction relative to the crossbar 115 would/could be used for installation. Note, the tool 600 could be used to impart the rotational motion for installation as well; however, the ramped leading surface of the clip would be engaged by the crossbar and this would cause a deformation not unlike that shown in FIG. 6C, though operative in the direction opposite that of 221*b*.

FIG. 7 provides some more detail of one type of replaceable advertising device, e.g., an appurtenant panel 130. Portions of note include the face surface 131 which might be used for indicia, particularly, though not necessarily of an advertising type, and may be of a variety of alternative forms, whether integrally formed with or removably or irremovably set thereon or therein. A potential advantage of an appurtenant panel 130 may be that it could be relatively easily removable (though perhaps preferably with a particular tool to avert undesirable, vandalistic removal) and replaceable with an alternative panel (not shown), differing primarily (if perhaps solely) in the indicia displayed on or as a part of the panel 130. Fast and efficient removal, installation and/or replacement may thus be achievable. Note, though stickers such as those often used previously may also be used here, many typical implementations would not use stickers and use instead interchangeable, replaceable panels 130 which each have discrete presentations screen printed directly thereonto or molded directly thereinto, the discrete presentations often being of different branding or sponsorship, venue or team affiliation or the like. Moreover, the front face of the panel 130 may be of different shapes, sizes and/or may include alternative messaging types, as for example, electronic or electromagnetic presentations such as light emitting diode (LED) presentations, or other electronic presentation forms providing visual or aural (or other sensory) signals (as for example, liquid crystal display (LCD), plasma or other presentation forms) such presentations perhaps providing scrolling, static, flashing, random and/or updateable custom messaging, such messaging alternatively being re-programmable on particular panels 130 or being set such that alternative messaging is provided by replacing the LED or other electronic presentation panel 130. Re-programmability might include an ability to broadcast or nearcast a re-programming signal to one or more electronic presentation panels 130 simultaneously or serially. Radio Frequency (RF) signals could be usable here. RF Identification (RFID) could be useable herefor. Presentations aurally could be sent via one or more advertising apparatuses to an individual patron via the airspace between the patron and the advertising device, or to listening device such as a headset or an earbud. The listening device could be radio frequency enabled to receive radio frequency signals from the advertising apparatus, such as being an AM or FM or like radio device. Any of these could be used for general advertising, general announcements, play-by-play announcements along or alternatively involving provision of player statistics, or the like or venue advertisements.

Functional portions of the panel 130 which might provide for detachable attachment of a panel to a body 120 (see e.g., FIG. 4A) might include one or more slots 132, and, may in some implementations be on one or, as shown in FIG. 7, on both lateral sides of the panel 130. In some cases, as for example shown in FIGS. 7A, 7B and 7C, the slots 132 may be in or adjacent a respective one or more tongues 133. As shown in FIG. 7C, a tongue 133 may be inserted into a receiving area 155 of a body 120 of an advertising apparatus 100. The tongue 133 may then ride up a ramped catch 160 (see e.g., FIG. 7D) until the slot 132 may be engaged thereby (a dashed line representation of a tongue caught on/by a catch 160 is shown in FIG. 7D). This would provide for holding the appurtenant panel 130 in place relative to the body portion 120 and thereby provide a desirable visibility for the replaceable advertising indicia on the panel 130, if any, and thereby provide an advertising function of the overall combination.

Figure 7A:
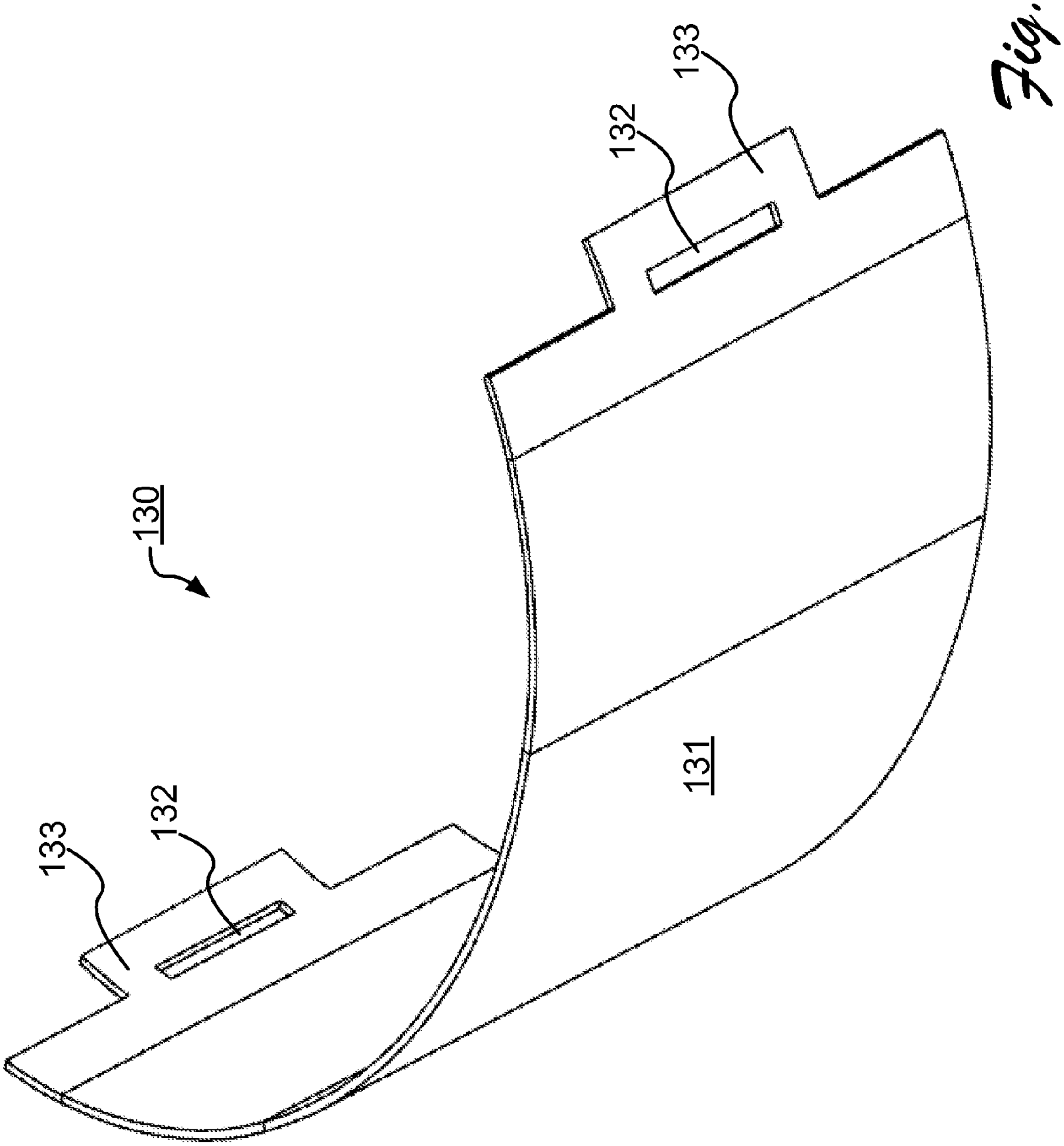
FIG. 7, which includes sub-part FIGS. 7A, 7B, 7C and 7D, provides isometric, elevation and plan views of an appurtenant panel for an advertising apparatus such as that in FIGS. 1-5.
Figure 7B:
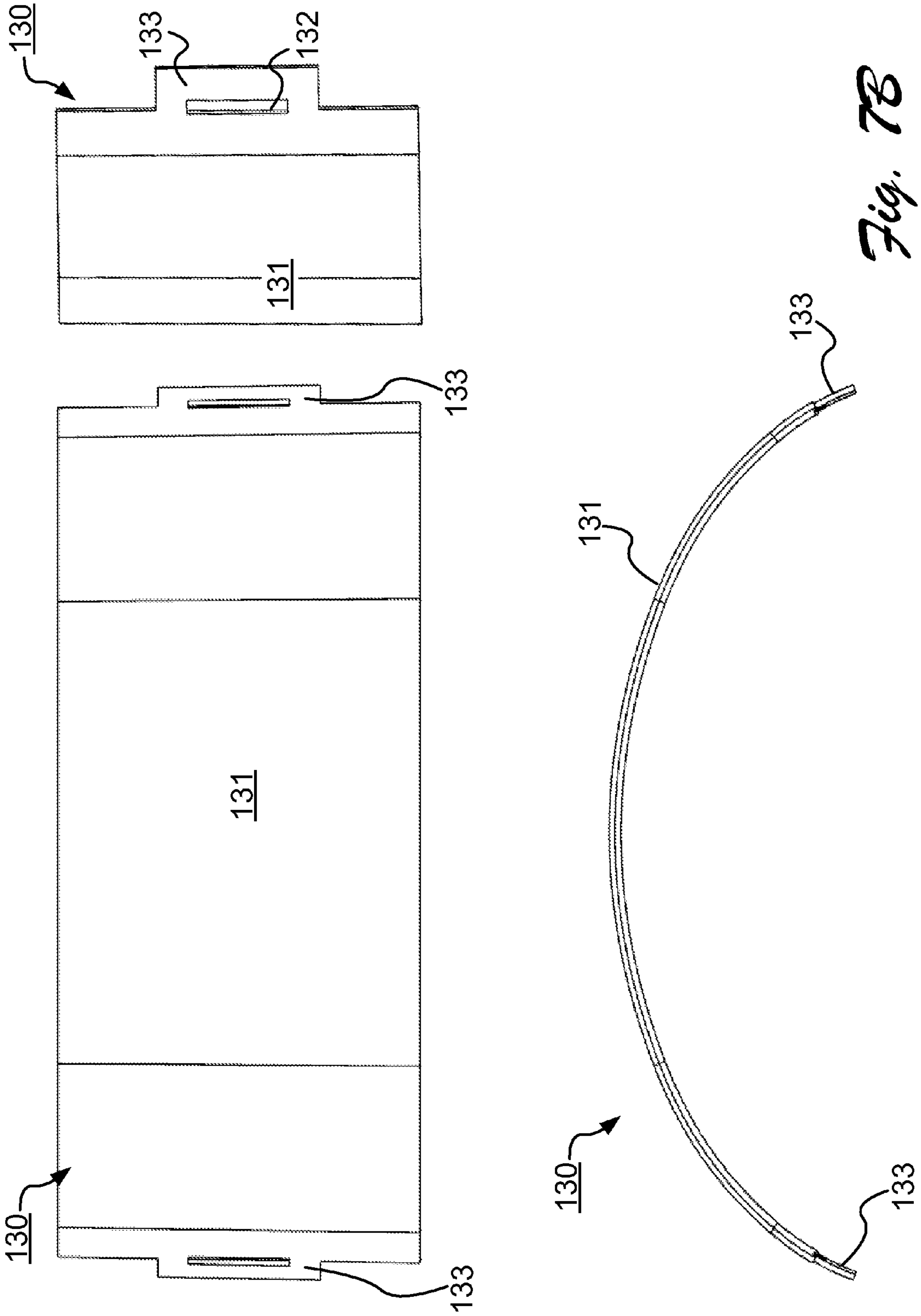
Figure 7C:
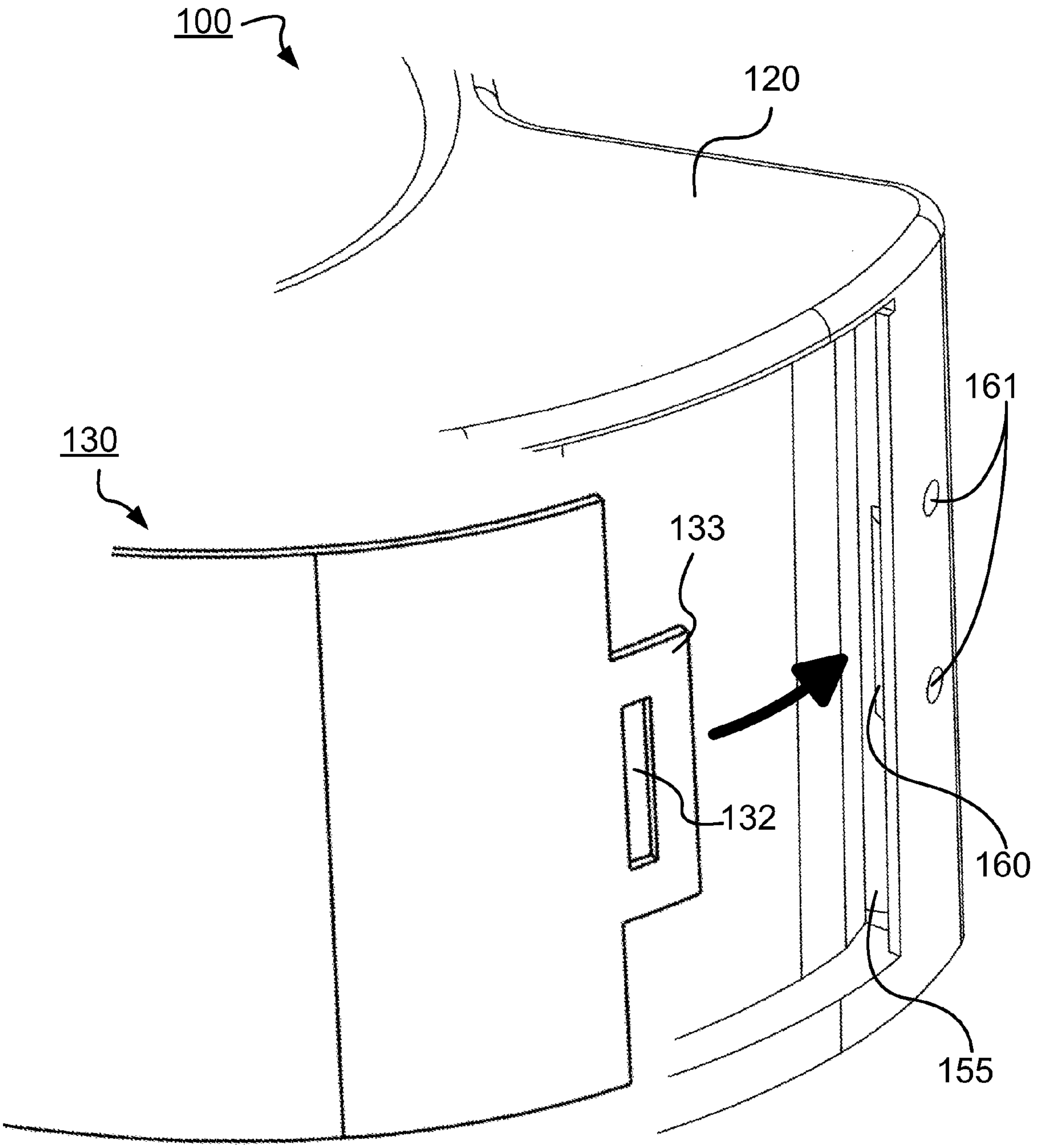
Figure 7D:
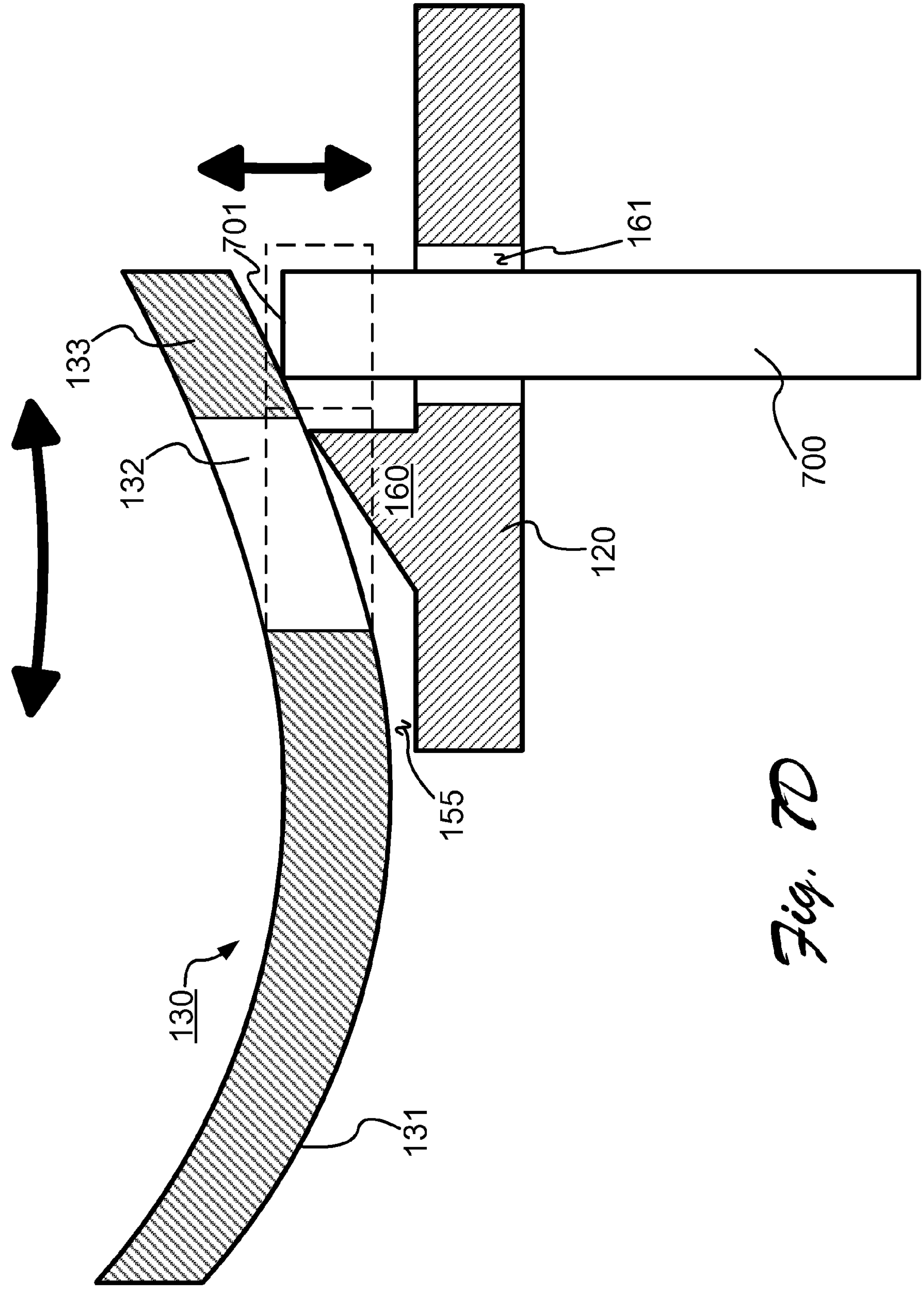

In some implementations, a removal of an appurtenant panel 130 may be effected by releasing the tongue and slot combination 133/132 from the catch 160. In the implementations of FIGS. 7C and 7D, one or more holes 161 (two shown in FIG. 7C) may be established for the purpose of receiving a tool 700 with a tongue-engaging portion 701. The tongue-engaging portion 701 may then engage the tongue 133 moving it so that the slot 132 will no longer be caught by the catch 160. The tongue and slot combination 133/132 may then be removed from the receiving area 155. Note, in a variety of implementations like this, the panel or a part thereof, as for example, the tongue, or the part of the panel adjacent the tongue, might be resiliently deformable so that the panel and the tongue will return to or toward their original disposition after having been forced to move either by the ramped catch 160 during installation or by a tool 700 at removal. A tool 700 may be like or not unlike that tool 600 in general overall appearance, though may have different sized or spaced prongs for insertion in the respective apertures or holes; or, it may alternatively be that the same tool would/could be adapted for use for both the disk 210 and the panel 130, with the same or substantially/operatively similar distances and/or sizes for prongs for engaging the respective clips 220 and tongues 133.

Figure 8A:
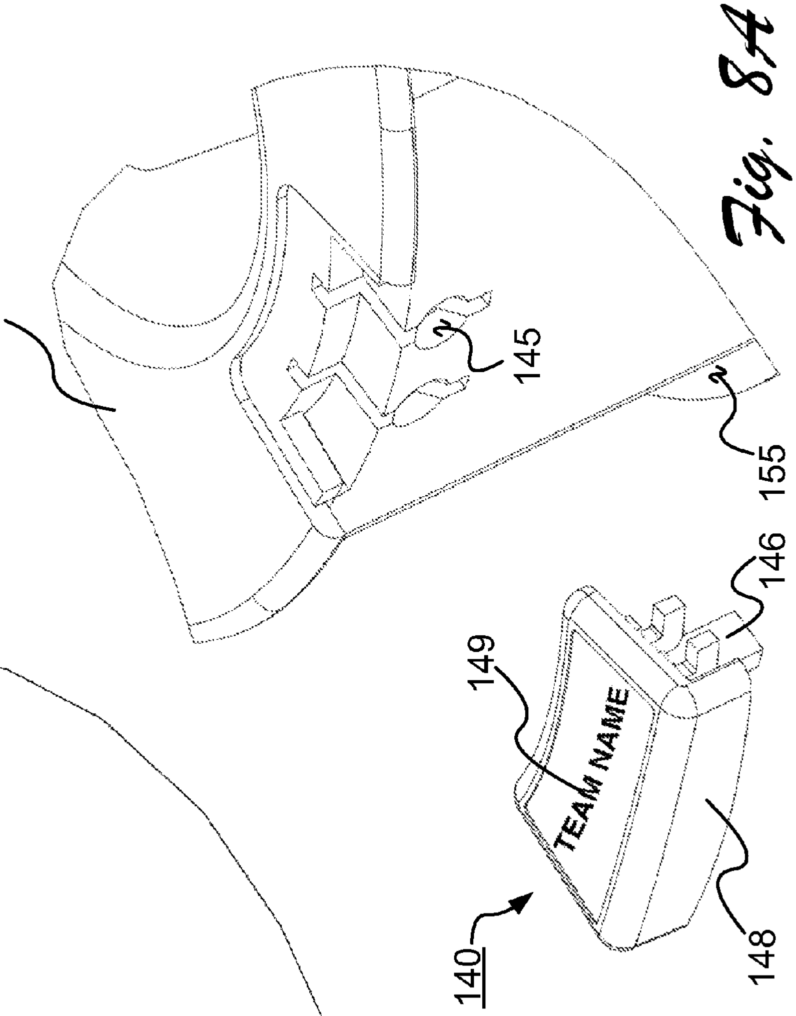
FIG. 8, which includes sub-part FIGS. 8A and 8B, provides respective isometric and cut-away elevational views of an emblem for an advertising apparatus such as that in FIGS. 3-5.
Figure 8B:
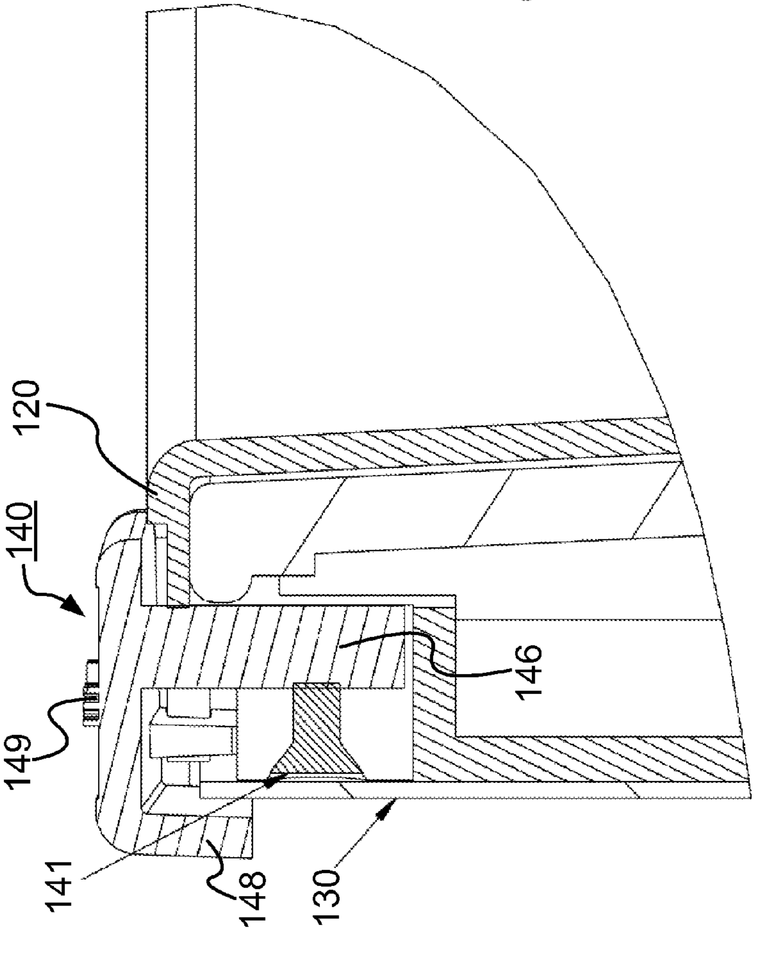

FIG. 8 provides some views of an alternative advertising device, here an emblem 140 as such may be attached to a body portion 120 hereof. Note, an emblem 140 may be used with or without an appurtenant panel 130 such as that described above, though it may be that use of the two together may provide some advantage as described below. In FIG. 8A, the emblem is shown detached from the body portion 120, and alternatively attached thereto in FIG. 8B. As introduced above, one or more screws 141 may be used to make such a connection, such a screw or screws being disposed in an aperture 145 therefor (see FIG. 8A), and bearing a leg or legs 146 against a surface of body 120 (see FIG. 8B). In this shown implementation, the emblem 140 has an overhanging portion 148 which may overhang over the appurtenant panel 130 (see FIG. 8B) when installed. This may in some instances operate to either hold the appurtenant panel 130 in place within the receiving area 155, or it may aid in frustrating vandalistic removal attempts either in actually restraining removal of a panel 130, or merely appearing to. As shown, there is no actual contact of the emblem 140 with the panel 130, though this need not define the operative relationship therebetween, if any. Moreover, as shown in FIG. 8B, the panel 130 is disposed to cover the screws 141, thereby possibly providing a restrictive affect to the removal of the screws 141 and thus potentially also assisting in the prevention of vandalistic removal thereof. A logo 149 is also shown in/on the emblem 140. This logo may be of a raised or depressed relief form, embossed as shown or debossed, or otherwise formed on, in or attached to the emblem 140. Such an emblem 140 may, as was panel 130, be a removable, replaceable advertising device or vehicle which may be made in two or more or a variety of forms, or with a variety of messages, or logos, or website addresses or having other information to be attached to and become a detachable or replaceable part of an advertising apparatus 100. Thus, it may be that emblem members may be made relatively interchangeable, coming in different colors and/or with one or more of a variety of logos or emblems (e.g., of different sporting teams) so that each advertising apparatus 100 may be relatively customized for a different team or stadium or event or the like. Messages may thus be changed at a proprietor's desire. Note, though stickers such as those often used previously may also be used here, many typical implementations would not use stickers and use instead interchangeable, replaceable emblem members 140 which each have discrete presentations screen printed directly thereonto or molded directly thereinto, the discrete presentations often being of different branding or sponsorship or team affiliation or the like. Also and/or alternatively, the front or top face of the emblem 140 may be of different shapes, sizes and/or may include alternative messaging types, as for example, light emitting diode (LED) presentations, such presentations perhaps providing scrolling, static, flashing, random and/or updateable custom messaging, such messaging alternatively being re-programmable on particular emblems 140 or being set such that alternative messaging is provided by replacing LED emblems 140. Furthermore, as before, special tools and/or methods may be employed to install and remove such emblems to avert vandalism. Also, it may be that such devices may be adapted to be easily, quickly and/or efficiently removable, installable and/or replaceable.

Figure 9:
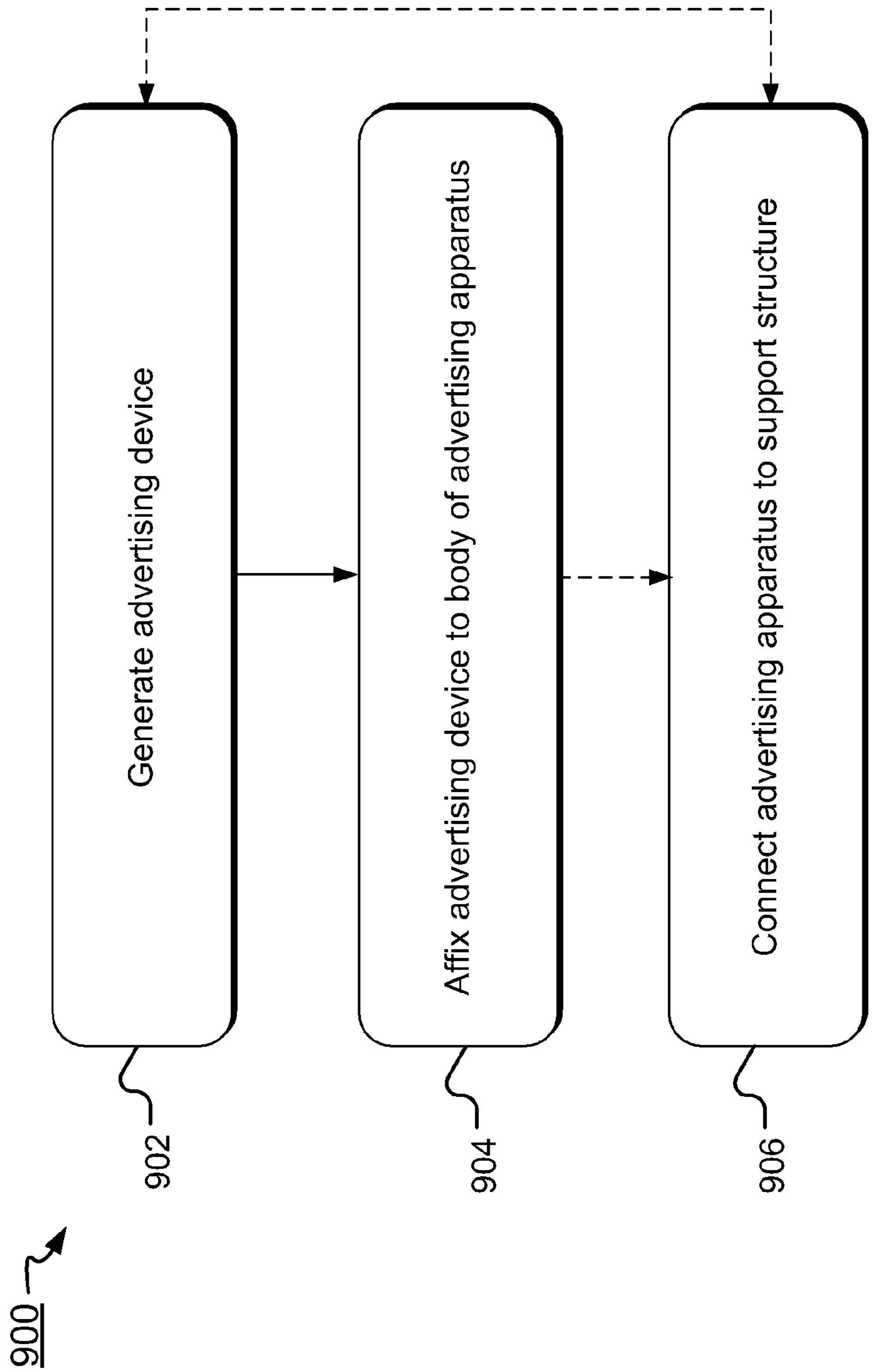
FIG. 9 is a flowchart of a method hereof.

FIG. 9 provides a succinct method 900 for displaying advertising material which includes the generation of the material either in or on (integral with or otherwise attachable to) an advertising device such as either or both of a panel 130 and/or an emblem 140, see operation 902 of FIG. 9. A further operation 904 involves the attachment or affixation of such a device, e.g., panel 130 and/or emblem 140, to a body portion 120 of an advertising apparatus 100 (though it should be noted that in some instances, the device, e.g., panel 130 and/or emblem 140, may be pre-attached to the body portion, with advertising material to follow in connection thereto). A still further operation 906 is in the connection of such an apparatus 100 to a support structure 110, such as a cup holder 110. Note, the dashed line arrowheads between operations 906 and respective operations 902 and 904 suggest the interchangeability and thus change or alteration of order of these operations. In other words, the connection operation 906 may take place first or last (or alternatively in between operations 902, 904).

Figure 10A:
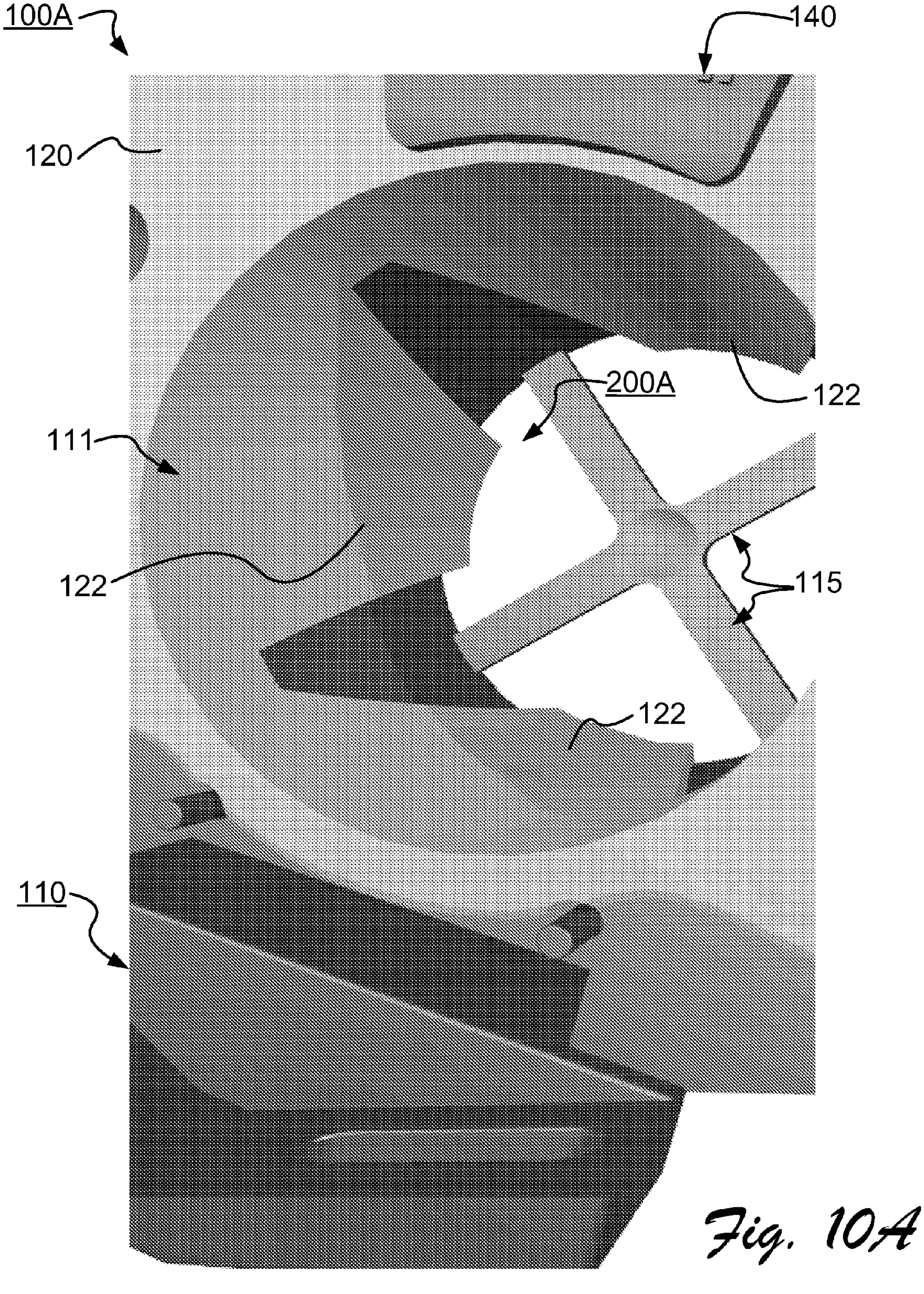
FIG. 10, which includes sub-part FIGS. 10A, 10B and 10C, provides isometric views of an alternative apparatus hereof, FIG. 10A from the top-down, FIGS. 10B and 10C both bottom-up views of the advertising apparatus, 10B un-attached, and 10C attached to a support structure.
Figure 10B:
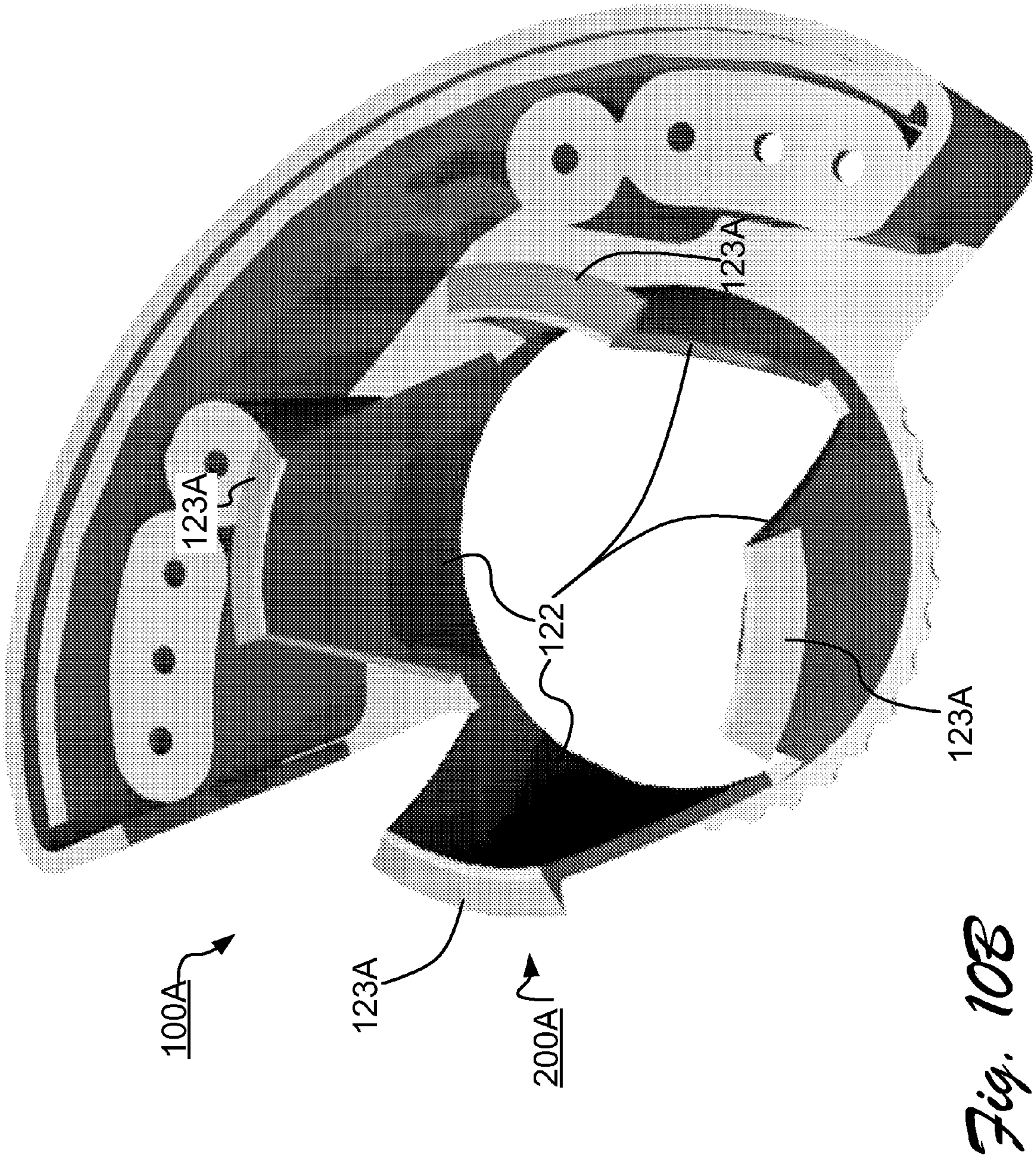
Figure 10C:
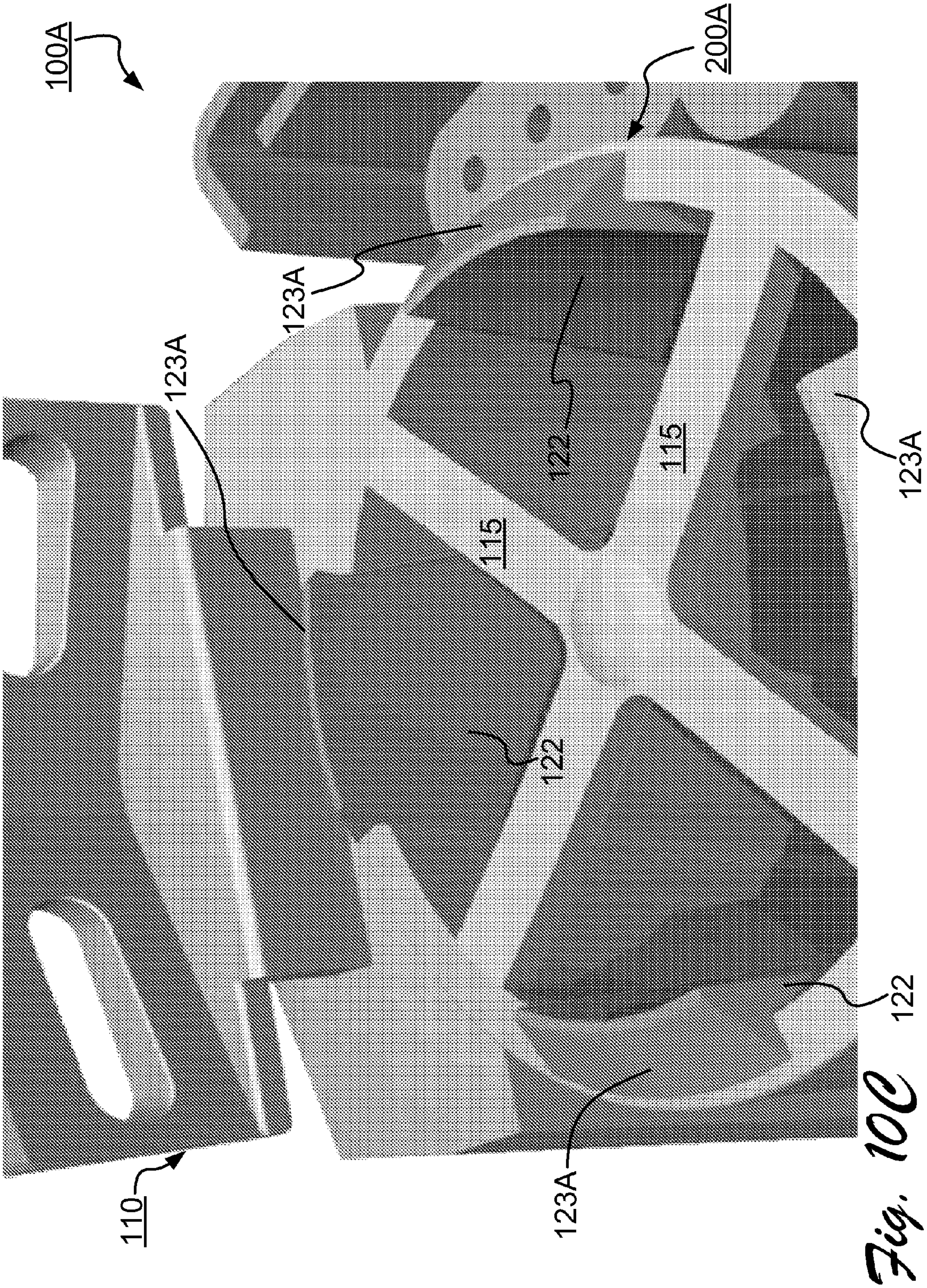

FIG. 10 illustrates several views of an alternative implementation of a cupholder attachment apparatus 100A. In FIG. 10A, the view is topdown mounted in a cupholder 110, and in FIGS. 10B and 10C, the views are of the body portion 120 from the bottom, looking-up (top down and bottom up are substantially arbitrary designations intended for description purposes only and not as invention limitation definitions). In this implementation, the cupholder attachment apparatus may be held in place by an alternative connection system 200A which may include one or more finger or latch members 123A (FIGS. 10B and 10C). The latch members 123A are attached to the legs 122 and are outwardly pointing therefrom. These latch members 123A may slide or be slid into place through the cupholder opening 111 along the inner cylindrical wall of the cupholder 110. The latch members may define a flange portion adapted to be removably engaged with or anchored to and around the edge of the base circumference of the cupholder 110. Once the one or more latches 123A have been aligned and anchored by/as the respective flange portions to the base circumference of the cupholder 110, the body portion 120 may be securely mounted on the cupholder 110

(in some implementations, this may be simply removable, in others, the removal may be intentionally difficult, indeed requiring a special tool for removal). FIG. 10B shows an unmounted view of the cupholder attachment apparatus from the bottom up, illustrating the undeployed latches/flanges 123A and their orientation relative to each other and to the other portions of the body portion 120. Note, these illustrations, with a clear view through to the cross portion of the base 115 of the cupholder 110, show that the cupholder's functionality may be largely unobstructed by the coupling of the attachment apparatus 100 or 100A to the cupholder 110.

Figure 11A:
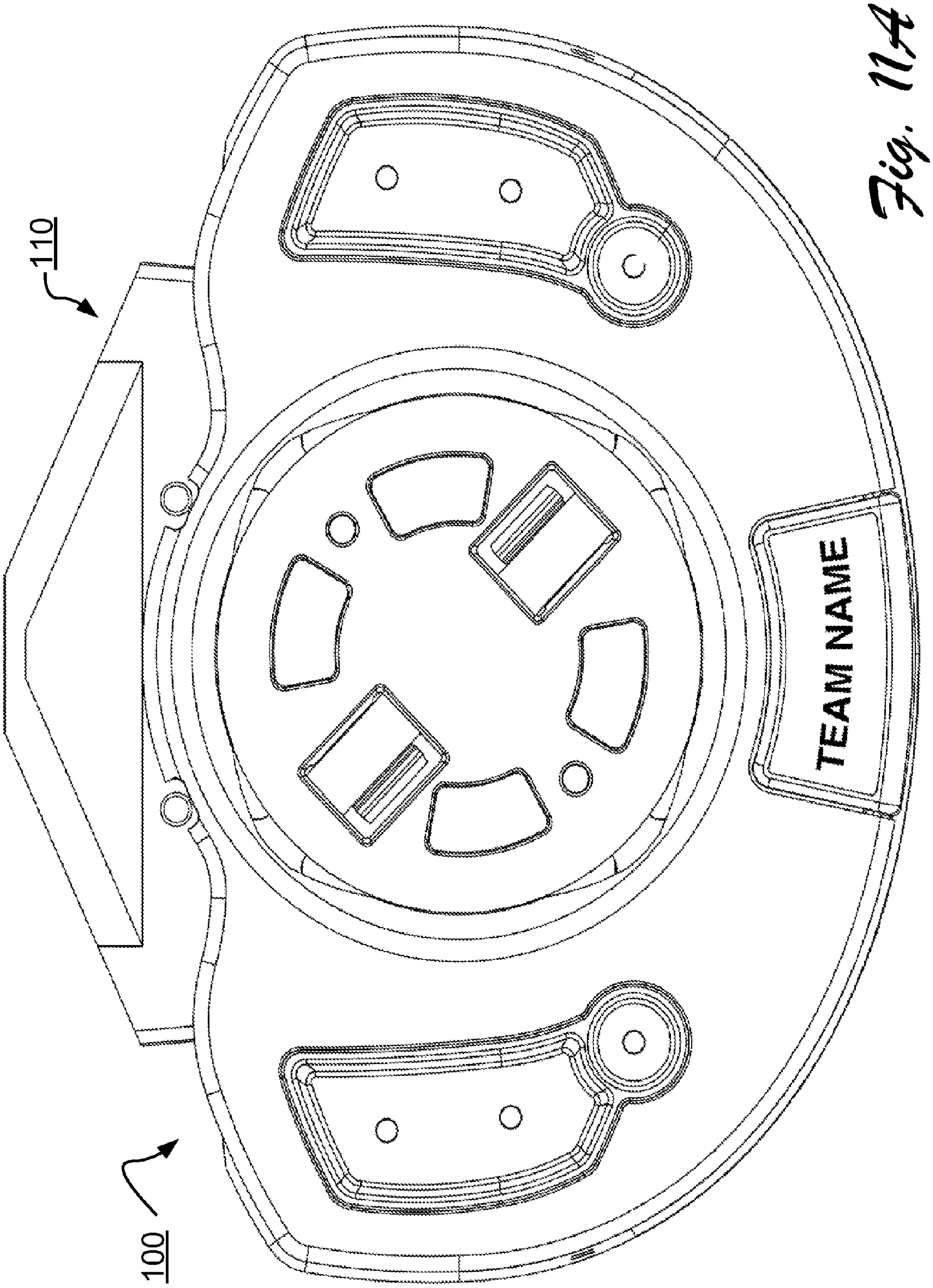
FIG. 11 provides respective views of another version of an advertising apparatus hereof, wherein the advertising apparatus is adapted to be affixed to a support structure such as a cupholder; and, FIG. 12 provides respective views of yet another version of an advertising apparatus hereof, wherein the advertising apparatus is adapted to be affixed to a support structure such as a cupholder in an alternative disposition relative thereto.
Figure 11B:
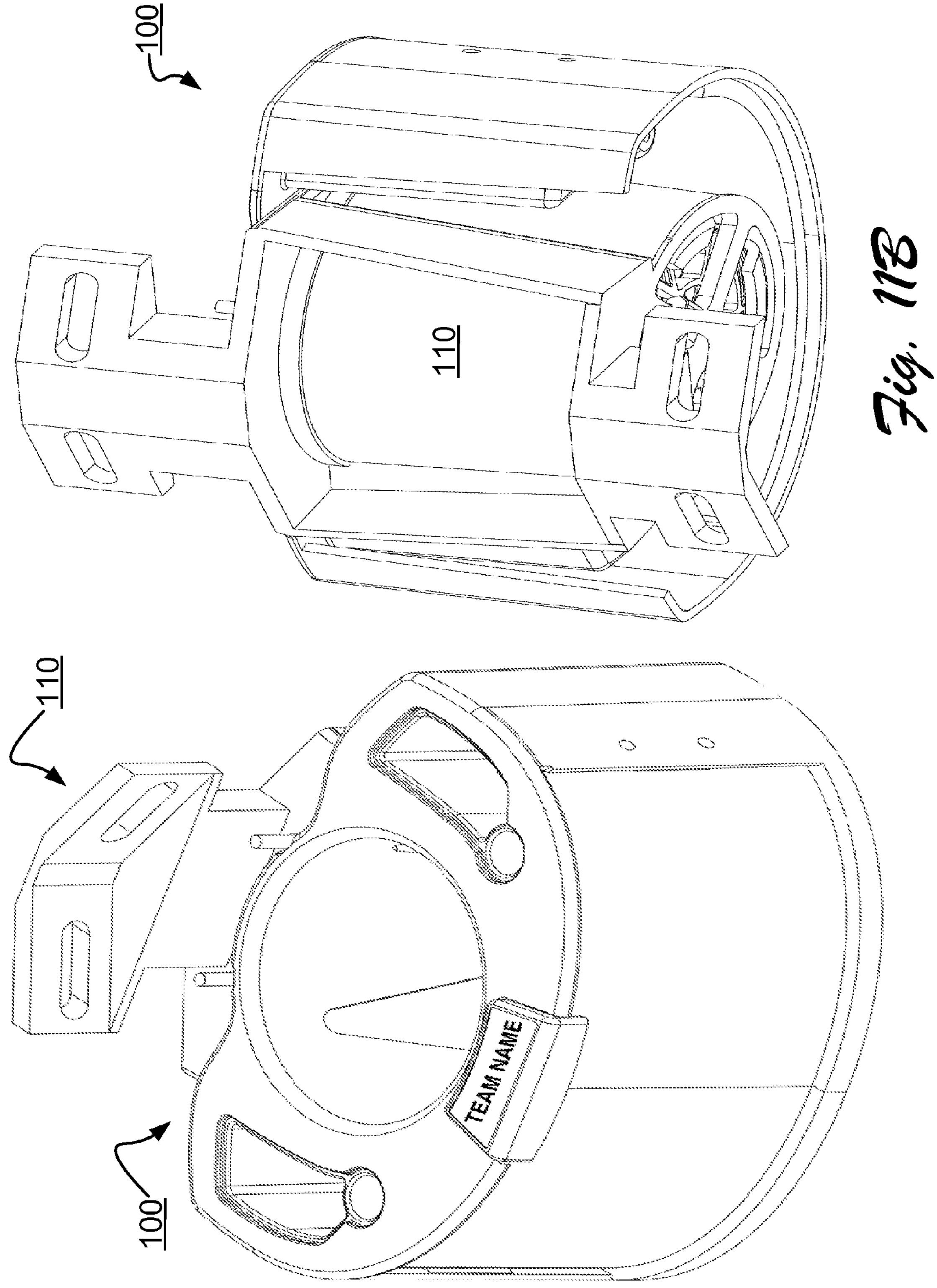
Figure 12A:
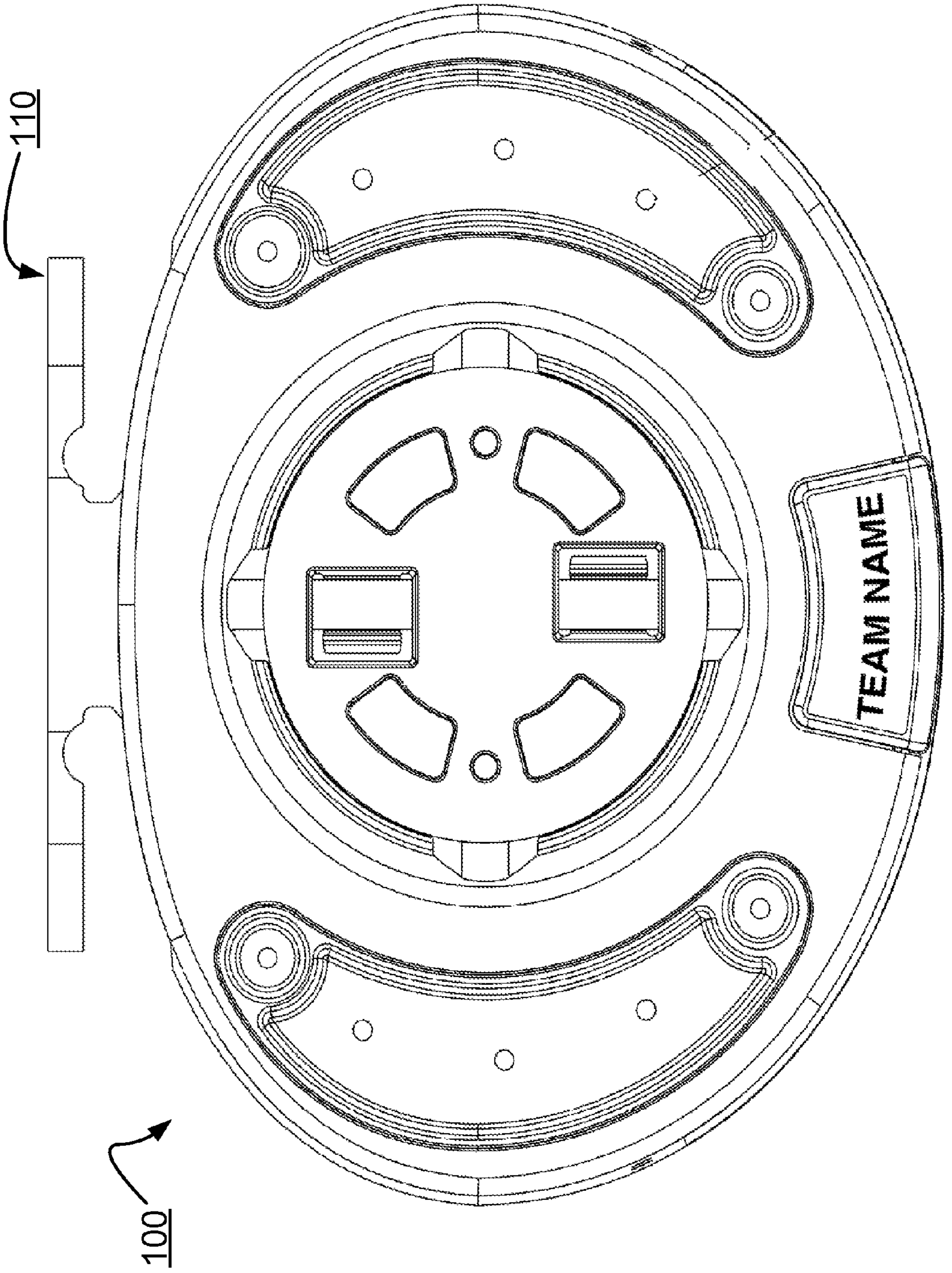
Figure 12B:
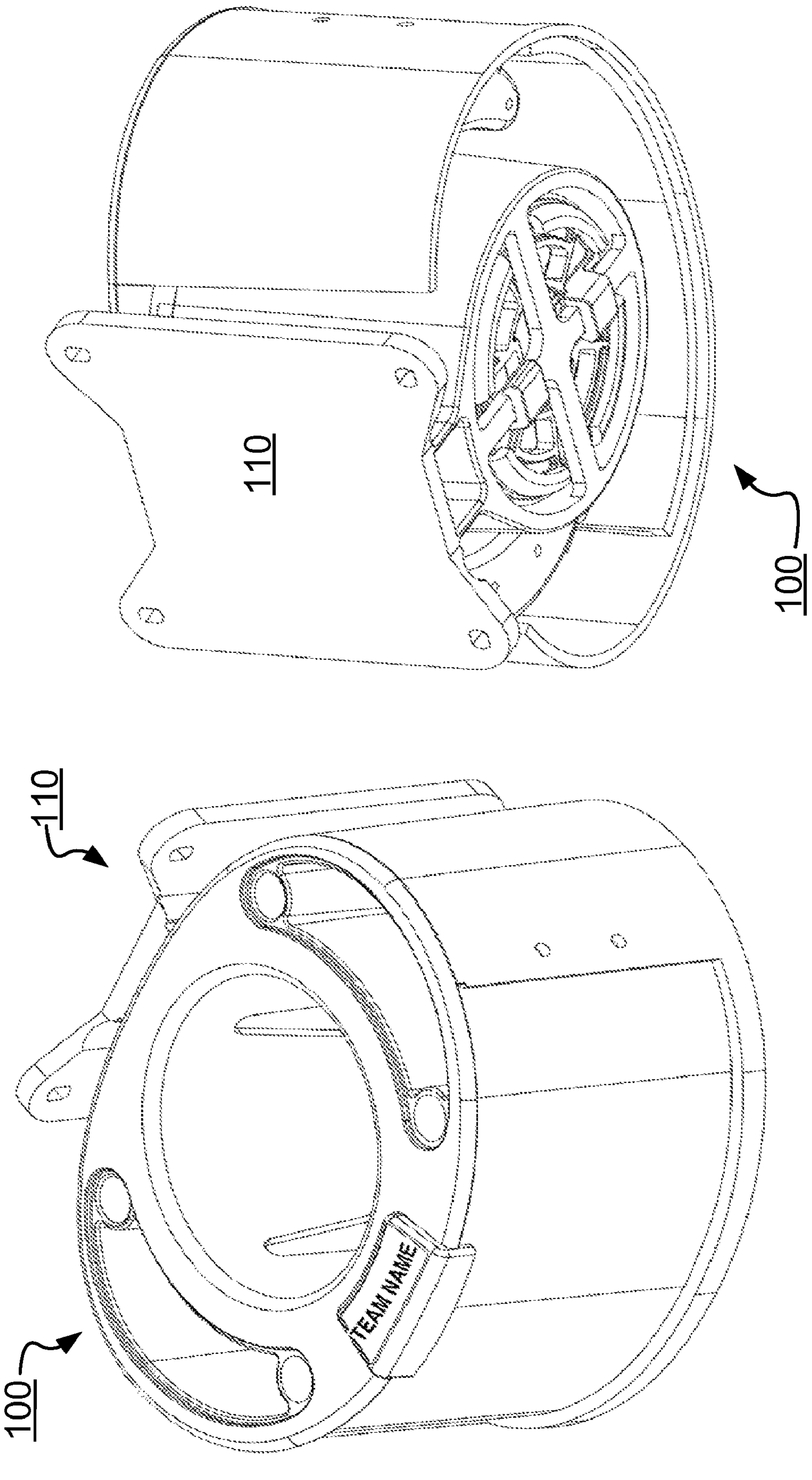

FIGS. 11 and 12 illustrate additional configurations of cupholder attachment apparatuses 100, as viewed from the top down (FIGS. 11A and 12A) and isometrically (FIGS. 11B and 12B). These additional configurations may also be adapted to be mounted upon substantially standard-sized cupholders 110. The configurations may depend on the configuration and mounting arrangement of the cupholders 110, adapting for patron traffic and maximum visibility and/or otherwise providing one or more alternative functionalities. For example, the cupholder attachment apparatus 100 in FIG. 11 may be intended to be mounted onto cupholder 110 relative to a seat in the middle of a row of seats, where the appurtenant panel 130 (not shown in FIG. 11) may be maximally visible to the seated patrons. This may be compared/contrasted with the version shown in FIG. 3, in which the cupholder may be disposed at one of a variety of angles to maximize the view. The version of FIG. 11 would not likely be disposable at more than a few angles. In FIG. 12, on a further other hand, the cupholder attachment apparatus 100 depicted may be mounted to a cupholder that is on the back of a seat on the end of an aisle, or against a wall, so that the appurtenant panel 130 may be even more maximally visible to patrons rather than showing advertising to a wall or to untrafficked space. The outer portion of this FIG. 12 cupholder attachment apparatus 100 substantially encircles the cupholder and may have a more wrap-around type of appurtenant panel 130 so that the appurtenant panel more substantially encircles the cupholder to allow for additional advertising material around the circumference of the cupholder attachment apparatus 100. Either the FIG. 12 alternative, and/or returning to the implementation of FIG. 11, the cupholder attachment apparatuses 100 shown here may be mounted onto a cupholder 110 in such a manner that they extend away from the seat to which either are mounted.

An advertising apparatus such as a cupholder attachment apparatus such as any of those described above may thus provide convenient and attractive ways to display advertising in such a manner as to make it highly visible to the consumer, with a cupholder attachment apparatus base configured to be easily mounted and secured in a visible location, and often having one or more detachable advertising devices, either or both of a front portion for display of the advertising, and/or optionally an advertising emblem member portion for interchangeable display of advertising or other indicia. An ease and/or quickness of changing or replacing the front or emblem members can be attractive features for changing advertising or other indicia, either in semi- or substantially permanently installed dispositions of the base unit, and/or for the advantage of mass producing base members or units on a larger scale for alternative locale usage, with production of fewer of each of different advertising/indicia devices for different locales. Thus, molds would not need to be changed for base members 120 carrying locale-specific information/advertising/indicia. Note, exemplar locales or markets for use hereof may including places where cupholders are currently used, stadiums (municipal, local, college or professional sports venues or raceways, e.g.), churches, movie theatres, concert venues or mass transit.

As introduced above, a variety of alternative structures may implement the advertising/indicia changing methods and/or apparatuses hereof. Support structures may come in different forms not restricted to cup-holders, but rather may include seat back structures of a variety of sizes, shapes and/or styles, e.g. Thus, the support structure may be other than a cup holder, and may be free-standing or may be pre-attached to or may simply be a seat structure, such as a seat back or arm or other portion of a seat. Support structures may be on structures other than seats or otherwise. Free-standing structures may take many shapes depending upon a particular locale. Moreover, though retrofit apparatuses have been shown and described in some detail herein, the scope and content hereof is not so limited, and instead may include base structures which may incorporate the typically relative "quick" change advertising replacement options described herein. Still furthermore, the connection mechanisms hereof are illustrative only as well and not limitative of the scope and content hereof. Other connection mechanisms for either display panels or emblem members may be used to the same or substantially the same effect, and thus be covered hereby.

Apparatuses hereof may be made by any of a variety of methods and/or of a variety of materials. In many instances, impact resistant and/or ultraviolet (UV) stable resin or material may be selected. Plastics molded to integral or unitary forms as shown herein may be typical, though other forms and materials may be used as well. Sonic welding and/or glues and epoxies may be used to achieve certain combinations of shapes as well. Moreover, any of many alternative colors and/or color schemes may be used, whether for matching team or other affiliation, or for matching locale usage. Shapes and sizes are not limited to those shown and described here either, as sizes and shapes may be selected to adapt to any of many alternative support structures. Also, embossing and/or debossing of messages, logos or alternative communicative or decorative features, as part of the manufacturing process on any one or more surfaces may also be used, as for one example on the top surface adjacent or in lieu of the emblem member. If plural parts are used, different colors and/or embossing or other schema may be used to enhance interchangeability.

Although the present invention has been described with reference to preferred implementations, workers skilled in the art will recognize that changes may be made in form and detail without departing from the spirit and scope of the invention.

What is claimed is:

1. An advertising apparatus comprising:

a body portion adapted to be connected in a tamper-resistant manner to a discrete pre-existing support structure accessible for advertising purposes, wherein the body portion is adapted to be retro-fit to the discrete pre-existing support structure and wherein the support structure is a cupholder; and, an advertising device which is one or more of removable, interchangeable and replaceable;

wherein the body portion has at least one latch portion for coupling with a support structure, and the latch portion has at least one flange adapted for securing the body portion to the support structure; wherein the flange of the latch portion is adapted to engage a portion of the support structure and a connection structure; wherein the connection structure is a disk with at least one clip member, the flange being adapted to engage the disk and the clip member being adapted to engage a portion of the support structure to provide a tamper-resistant connection to the support structure; and, wherein the advertising device is adapted to be one or both of removably connected to or disposed on the body portion, and, wherein the advertising device has an insertion portion, and the body portion has a receiving portion for receiving and retaining the insertion portion of the advertising device to secure the advertising device to the body portion.

2. An advertising apparatus according to claim 1, the body portion having an overhang portion extending away from and connected to the at least one latch portion; wherein the overhang portion is adapted to have the advertising device be one or both of connected thereto or disposed thereon.

3. An apparatus as recited in claim 1, wherein the support structure is one or more of a seatback, armrest and a cupholder.

4. An apparatus as recited in claim 1, wherein the advertising device includes one or both of an appurtenant panel and an emblem member.

5. An apparatus as recited in claim 1, wherein the advertising device is one or both of an appurtenant panel and an emblem member.

6. An apparatus as recited in claim 1, wherein the advertising device bears advertising on an external surface for display to a consumer.

7. An apparatus as recited in claim 1, wherein the advertising device is readily adapted for display of advertising material including one or more of printed material, reverse printed material, or material imaged on the back side of a clear advertising device, adhesive material, stickers, an electronic or electromagnetic presentation, an LED, LCD or plasma presentation, or removable material or materially integrally formed thereon, or as a part thereof.

8. An apparatus as recited in claim 1, wherein the apparatus is adapted to be coupled to one or more of a variety of cupholders; the body portion being configured in a manner that allows the advertising device to be mounted in one or more of a manner that spans substantially the entire circumference of the body portion; an orientation opposite to a seat back to which a cupholder is mounted; and, an orientation opposite to and adjacent to a seat back to which a cupholder is mounted.

9. An apparatus as recited in claim 1, wherein the body portion and the advertising device are each made of one or the other of a moldable material and a die-cut material.

10. An apparatus as recited in claim 1, wherein the body portion is adapted to be one or both of simple to install on or difficult to remove from a support structure.

11. An apparatus as recited in claim 10, wherein through employment of an appropriate tool, the body portion is adapted to be one or both of simple to install on or simple to remove from the support structure.

12. An apparatus as recited in claim 1, wherein the advertising device is adapted to be one or both of simple to install on or difficult to remove from a body portion.

13. An apparatus as recited in claim 12, wherein through employment of an appropriate tool, the advertising device is adapted to be one or both of simple to install on or simple to remove from the body portion.

14. An apparatus according to claim 1, wherein the insertion portion of the advertising portion includes one or more of a leg and a tongue, and the receiving portion of the body portion is adapted for receiving and retaining the one or more of a leg and a tongue of the insertion portion to secure the advertising device to the body portion.

15. An advertising apparatus according to claim 1 wherein the flange of the latch portion is adapted to engage one or the other of a portion of the support structure and a connection structure.

16. An advertising apparatus according to claim 15 wherein the connection structure is a disk with at least one clip member, the flange being adapted to engage the disk and the clip member being adapted to engage a portion of the support structure.

17. A system for advertising, the system comprising:

a support structure accessible to advertising to a consumer, the support structure being a cupholder; and, an advertising apparatus, the apparatus comprising:

a body portion adapted to be retrofit as one or both of connected to or disposed on the support structure in a tamper-resistant manner; and an advertising device, the advertising device being adapted to be externally coupled with the body portion; wherein the advertising device is adapted to be one or both of removably connected to or disposed on the body portion, and, wherein the advertising device has an insertion portion, and the body portion has a receiving portion for receiving and retaining the insertion portion of the advertising device to secure the advertising device to the body portions wherein the body portion has at least one latch portion for coupling with the support structure, and the latch portion has at least one flange adapted for securing the body portion to the support structure; wherein the flange of the latch portion is adapted to engage a portion of the support structure and a connection structure; wherein the connection structure is a disk with at least one clip member, the flange being adapted to engage the disk and the clip member being adapted to engage a portion of the support structure to provide a tamper-resistant connection to the support structure.

18. A method for advertising comprising:

generating advertising material on an advertising device;

attaching the advertising device to a body portion of an advertising apparatus, the advertising device being adapted to be externally coupled with the body portion in a tamper-resistant manner; wherein the advertising device is adapted to be one or both of removably connected to or disposed on the body portion, and, wherein the advertising device has an insertion portion, and the body portion has a receiving portion for receiving and retaining the insertion portion of the advertising device to secure the advertising device to the body portion; and, connecting the body portion of the advertising apparatus by retrofit to a support structure; the support structure being a pre-existing cupholder wherein the body portion has at least one latch portion for coupling with the support structure, and the latch portion has at least one flange adapted for securing the body portion to the support structure; wherein the flange of the latch portion is adapted to engage a portion of the support structure and a connection structure; wherein the connection structure is a disk with at least one clip member, the flange being adapted to engage the disk and the clip member being adapted to engage a portion of the support structure to provide a tamper-resistant connection to the support structure.

* * * * *